US012643436B2

(12) United States Patent
Fu et al.

(10) Patent No.: US 12,643,436 B2
(45) Date of Patent: Jun. 2, 2026

(54) MODULAR AND ELECTROMECHANICALLY INTEGRATED EASY-ENTRY MECHANISM

(71) Applicant: KEIPER SEATING MECHANISMS CO., LTD., Shanghai (CN)

(72) Inventors: Wenjin Fu, Shanghai (CN); Bin Huang, Shanghai (CN); Ke Liu, Shanghai (CN); Dong Liu, Shanghai (CN); Lei Sun, Shanghai (CN)

(73) Assignee: KEIPER SEATING MECHANISMS CO., LTD., Shanghai (CN)

( * ) Notice: Subject to any disclaimer, the term of this patent is extended or adjusted under 35 U.S.C. 154(b) by 504 days.

(21) Appl. No.: 18/027,708

(22) PCT Filed: Nov. 18, 2020

(86) PCT No.: PCT/CN2020/129719
§ 371 (c)(1),
(2) Date: Mar. 22, 2023

(87) PCT Pub. No.: WO2022/062139
PCT Pub. Date: Mar. 31, 2022

(65) Prior Publication Data
US 2023/0406166 A1     Dec. 21, 2023

(30) Foreign Application Priority Data

Sep. 22, 2020     (CN) ......................... 202011002610.7

(51) Int. Cl.
*B60N 2/12*     (2006.01)
*B60N 2/07*     (2006.01)
*B60N 2/90*     (2018.01)
(52) U.S. Cl.
CPC ........... *B60N 2/123* (2013.01); *B60N 2/0722* (2013.01); *B60N 2/919* (2018.02); *B60N 2002/952* (2018.02)

(58) Field of Classification Search
CPC .............................. B60N 2/0893; B60N 2/123
See application file for complete search history.

(56) References Cited

U.S. PATENT DOCUMENTS 8,746,795 B2 *   6/2014   Stoia ..................... B60N 2/0875
                                                        297/340
9,731,630 B2 *   8/2017   Sasaki ..................... B60N 2/123
                         (Continued)

FOREIGN PATENT DOCUMENTS

CN          105438014 A      3/2016
CN          206012373 U      3/2017
                  (Continued)

*Primary Examiner* — Timothy J Brindley
(74) *Attorney, Agent, or Firm* — BakerHostetler

(57)     ABSTRACT

A modular and electromechanically integrated easy-entry mechanism includes an easy-entry mechanism, manufactured independently of slide rail assemblies, and mounted on upper slide rails in the slide rail assemblies by fasteners. A total travel of slide rails is divided into a comfort travel for front-rear adjustment of a passenger and an easy-entry travel for increasing an easy-entry/exit space for a passenger in the third row seating. The unlocking of the slide rails is mechanically maintained in the easy-entry travel, and the slide rails are ensured to be locked at the front-most position of the comfort travel when a seat is retracted. The easy-entry mechanism is driven manually or by electric power, and acts independently on unlocking pins in slide rail locking mechanisms to unlock the slide rail assemblies. The easy-entry mechanism is modularly designed, easy to manufacture, mount, and replace, and does not affect the existing slide rail manufacturing process. Since the easy-entry mechanism independently acts on the unlocking pins in the slide rail locking mechanisms to unlock the slide rail assemblies, an existing manual slide rail unlocking module is not affected.

11 Claims, 16 Drawing Sheets

(56)  References Cited

U.S. PATENT DOCUMENTS

| | | | | |
|---|---|---|---|---|
| 10,065,532 B2 * | 9/2018 | Ioppolo | ................ | B60N 2/0893 |
| 10,160,351 B2 * | 12/2018 | Sugimoto | .............. | B60N 2/123 |
| 10,618,434 B2 * | 4/2020 | Goto | ................... | B60N 2/0887 |
| 10,682,928 B2 * | 6/2020 | Goto | ................... | B60N 2/0155 |
| 11,453,313 B2 * | 9/2022 | Chen | ....................... | B60N 2/08 |
| 2012/0119051 A1 | 5/2012 | Stola | | |
| 2019/0111811 A1 | 4/2019 | Stutika et al. | | |

FOREIGN PATENT DOCUMENTS

| | | | | |
|---|---|---|---|---|
| CN | 206856527 U | 1/2018 | | |
| CN | 207510267 U | 6/2018 | | |
| CN | 108312903 A | 7/2018 | | |
| CN | 109367444 A | 2/2019 | | |
| CN | 110641325 A | 1/2020 | | |
| DE | 102020212459 A1 * | 4/2022 | ........... | B60N 2/0875 |
| EP | 3366509 A1 * | 8/2018 | ............. | F16D 69/00 |
| WO | WO-2019112005 A1 * | 6/2019 | ............. | B60N 2/123 |

* cited by examiner

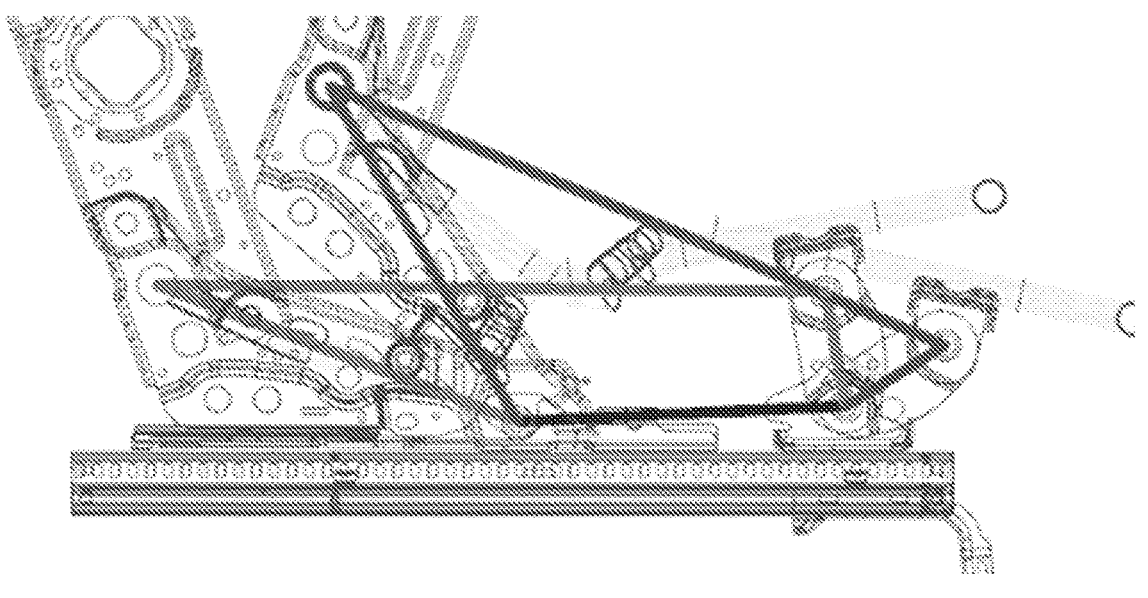
FIG. 1
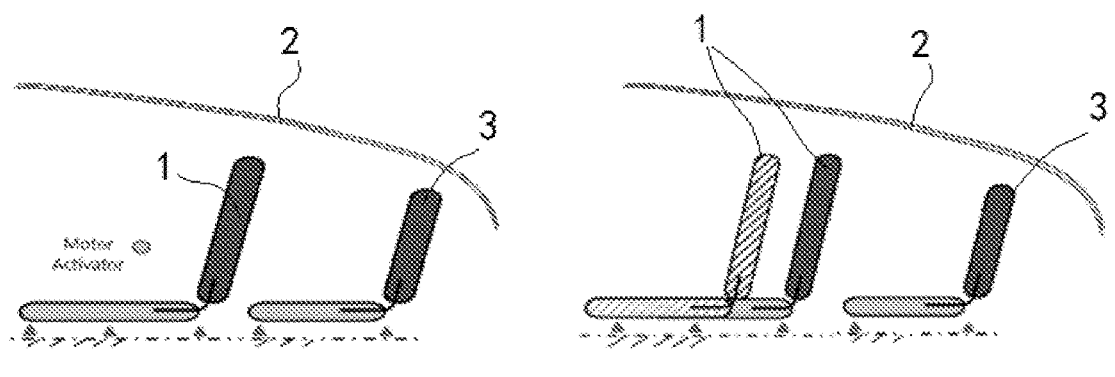
FIG. 2a                    FIG. 2b
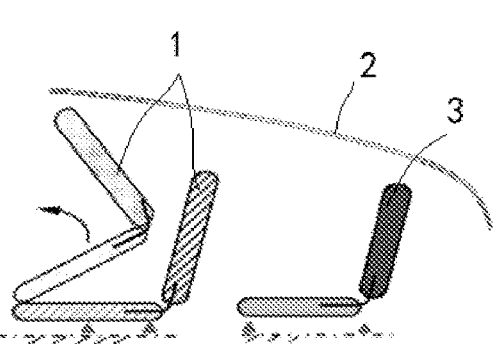
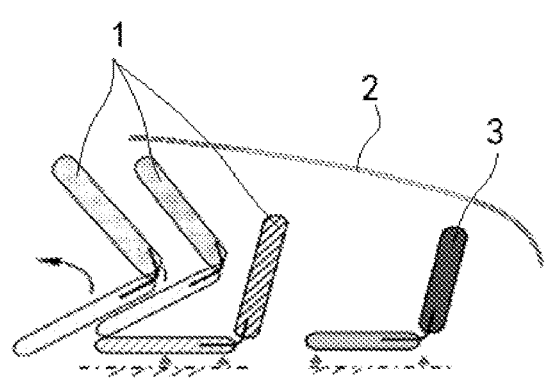
FIG. 2c                    FIG. 2d

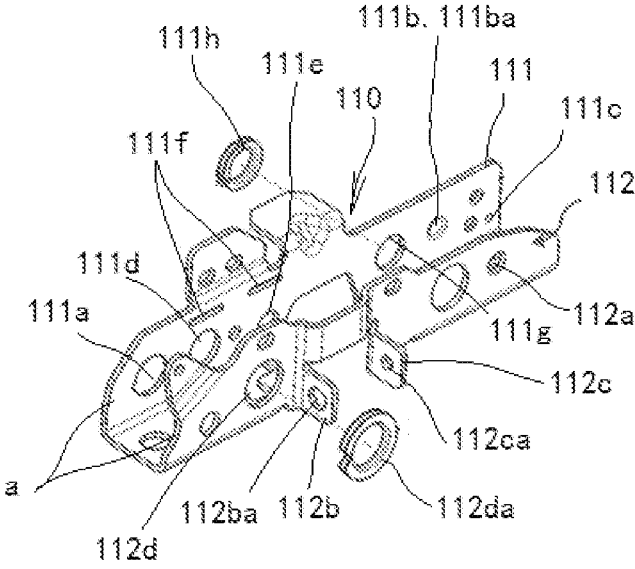
FIG. 9
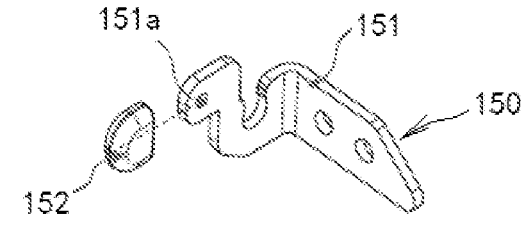
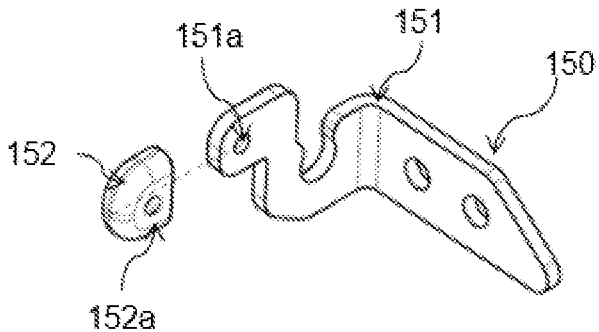
FIG. 10

MODULAR AND ELECTROMECHANICALLY INTEGRATED EASY-ENTRY MECHANISM

CROSS-REFERENCE TO RELATED APPLICATIONS

This application claims priority of International Patent Application No. PCT/CN2020/129719, filed on Nov. 18, 2020, which claims priority of Chinese Patent Application No. 202011002610.7, filed Sep. 22, 2020, the disclosures of which are incorporated by reference in their entirety.

TECHNICAL FIELD

The present invention relates to the technical field of vehicles, and in particular, to a modular and electromechanically integrated easy-entry mechanism.

BACKGROUND

For SUV and MPV models with three rows of seats, two rows of seats are required to have the function of easy-entry. The easy-entry function of slide rails means that a passenger can adjust the slide rail by a relatively short travel for comfort and limit the front-rear direction. When a passenger in the third row seating needs to enter, the seat may be reclined or folded, and the slide rail can be driven by a longer travel, so that a larger space is formed between the seat and a vehicle door to meet the requirement for entry/exit of the passenger in the third row.

The PITCH (seat folding) function currently available in the market is achieved through four-bar or six-bar linkage mechanisms. Specifically, refer to FIG. 1. A latch is first unlocked, and a seat linkage is folded through a coil spring, thereby driving an unlocking handle to unlock the slide rail.

For some compact or hatchback models, the space is limited. Referring to FIG. 2a to FIG. 2d, the second row of seats 1 may contact a roof 2 when folded from the final position. Therefore, in order to realize entry/exit of the passenger in the third row seating from the third row of seats 3, it is usually necessary to slide the second row of seats 1 forward by a certain travel and then turn up the second row of seats 1 to make enough space for entry/exit of the passenger in the third row.

For the mechanism that implements the easy-entry function of slide rails of the second row of seats, the following problems need to be considered:

1. How to facilitate the manufacturing and avoid affecting the existing slide rail manufacturing process during the manufacturing?
2. How to solve problems of some compact or hatchback models to facilitate entry/exit of the passenger in the third row?
3. How to unlock the manual slide rail through a low-power motor?
4. How to solve the problems of seat comfort adjustment and easy-entry parallel unlocking?
5. How to keep the slide rails unlocked in an easy-entry travel?
6. How to solve the problem of an excessively large and unsmooth seat adjustment sliding force?

SUMMARY

In order to resolve the above technical problems, the present invention provides a modular and electromechanically integrated easy-entry mechanism. The modular and electromechanically integrated easy-entry mechanism is modularly designed, and is easy to manufacture, mount, and replace.

A modular and electromechanically integrated easy-entry mechanism provided in the present invention includes an easy-entry mechanism. The easy-entry mechanism is manufactured independently of slide rail assemblies and is mounted on upper slide rails in the slide rail assemblies by using fasteners, a total travel of slide rails is divided into a comfort travel for front-rear adjustment of a passenger and an easy-entry travel for increasing an easy-entry/exit space for a passenger in the third row seating, the unlocking of the slide rails is mechanically maintained in the easy-entry travel, and the slide rails are ensured to be locked at the front-most position of the comfort travel when a seat is retracted. The easy-entry mechanism is driven manually or by electric power, and acts independently on unlocking pins in slide rail locking mechanisms to unlock the slide rail assemblies.

In a preferred embodiment of the present invention, the modular and electromechanically integrated easy-entry mechanism includes an easy-entry module and a manual slide rail unlocking module. The easy-entry module and the manual slide rail unlocking module are manufactured independently of the slide rail assemblies, and a fixed support in the manufactured easy-entry module is mounted on the upper slide rails in the slide rail assemblies by using fasteners. A rotary shaft of the manual slide rail unlocking module is arranged on the fixed support, and the easy-entry module and the manual slide rail unlocking module act independently on the unlocking pins in the slide rail locking mechanisms in the slide rail assemblies to unlock the slide rail locking mechanisms. In this way, the easy-entry module is modularly designed, is easy to manufacture, mount, and replace, and does not affect the existing slide rail manufacturing process.

In a preferred embodiment of the present invention, the easy-entry module further includes a slide rail parallel-unlocking mechanism submodule, an unlocking force and displacement adjustment mechanism submodule, an unlocking maintenance and tolerance expansion structure submodule, a cable limit assembly, and an easy-entry return spring mounted in the fixed support. An easy-entry unlocking cable is driven manually or by electric power to drive the unlocking force and displacement adjustment mechanism submodule to move and thereby drive the slide rail parallel-unlocking mechanism submodule and the unlocking maintenance and tolerance expansion structure submodule to achieve easy-entry unlocking through linkage, and the cable limit assembly performs unlocking limit maintenance on the unlocking force and displacement adjustment mechanism submodule. The easy-entry return spring drives the unlocking force and displacement adjustment mechanism submodule to return and thereby drives the slide rail parallel-unlocking mechanism submodule and the unlocking maintenance and tolerance expansion structure submodule to return. The slide rail parallel-unlocking mechanism submodule drives the slide rail locking mechanisms to unlock. The slide rail parallel-unlocking mechanism submodule fits in with a comfort adjustment front travel stop in the slide rail assemblies to limit a forward sliding position of a seat. A rear upper stop on the upper slide rails in the slide rail assemblies fits in with a rear lower stop on lower slide rails in the slide rail assemblies to limit a backward sliding position of the seat.

In a preferred embodiment of the present invention, the slide rail parallel-unlocking mechanism submodule includes:

a U-shaped unlocking support assembly axially arranged on the fixed support, where an easy-entry adjustment surface and a stop adjustment surface are arranged on a U-shaped unlocking support of the U-shaped unlocking support assembly, and during the easy-entry unlocking, the easy-entry adjustment surface acts on the unlocking pins of the slide rail locking mechanisms in the slide rail assemblies to unlock the slide rail locking mechanisms; and two ends respectively act on the U-shaped unlocking support assembly and an unlocking return spring on the fixed support.

In a preferred embodiment of the present invention, the U-shaped unlocking support of the U-shaped unlocking support assembly has an axially arranged end having a U-shaped structure, two axially arranged arms are arranged on the axially arranged end having a U-shaped structure, a shaft hole is formed on each of the two axially arranged arms, the shaft holes on the two axially arranged arms are coaxial, a shaft hole and a draw hole are respectively formed on two support arms of the fixed support corresponding to positions at which the U-shaped unlocking support assembly is axially arranged, the shaft hole and the draw hole are coaxial and internal threads are arranged in the draw hole, the axially arranged end having a U-shaped structure of the U-shaped unlocking support is axially arranged between the two support arms of the fixed support by extending through the shaft hole on one of the support arms, the shaft hole on one of the axially arranged arms, the unlocking return spring, the shaft hole on the other of the axially arranged arms, an axially arranged bolt of the draw hole on the other of the support arms in sequence, a threaded end of an axially arranged bolt is screwed on the internal threads of the draw hole on the other of the support arms, the axially arranged bolt is tightened to meet a torque requirement, and the axially arranged end having a U-shaped structure of the U-shaped unlocking support rotates about the axially arranged bolt.

In a preferred embodiment of the present invention, a sleeve is arranged on the axially arranged bolt, and the sleeve is arranged on the axially arranged bolt and two ends of the sleeve in an axial direction extend through the two shaft holes and contact inner surfaces of the two support arms of the fixed support, to prevent the U-shaped unlocking support from being unable to rotate resulting from retraction of the two support arms of the fixed support after tightening the axially arranged bolt.

In a preferred embodiment of the present invention, the slide rail parallel-unlocking mechanism submodule further includes:

a stop support axially arranged on the fixed support, where a stop is arranged on the stop support, and the stop fits in with the comfort adjustment front travel stop of the slide rail assemblies to limit the forward sliding position of the seat; and two ends respectively act on the stop support and a stop support return spring on the fixed support.

In a preferred embodiment of the present invention, the unlocking force and displacement adjustment mechanism submodule includes:

a cable support assembly, connected to the easy-entry unlocking cable and axially arranged between two support arms of the fixed support, where the cable support assembly is configured with a pinion;

a sector gear, axially arranged between the two support arms of the fixed support, where the sector gear is meshed with the pinion, and the pinion drives the sector gear to rotate; and an easy-entry unlocking arm assembly, arranged between the two support arms of the fixed support and driven by the sector gear to rotate synchronously with the sector gear, where an easy-entry unlocking surface in the easy-entry unlocking arm assembly acts on an easy-entry adjustment surface of the U-shaped unlocking support assembly to drive the U-shaped unlocking support assembly to move for an easy-entry unlocking operation.

In a preferred embodiment of the present invention, the cable limit assembly is fixed to one of the support arms of the fixed support, and a limiting head in the cable limit assembly fits in with an easy-entry unlocking arm of the easy-entry unlocking arm assembly to limit the easy-entry unlocking arm of the easy-entry unlocking arm assembly.

In a preferred embodiment of the present invention, one end of the easy-entry return spring is hooked on the easy-entry unlocking arm of the easy-entry unlocking arm assembly, and the other end is hooked on one of the support arms of the fixed support.

In a preferred embodiment of the present invention, the unlocking force and displacement adjustment mechanism submodule further includes:

a gear limit support arranged between the two support arms of the fixed support and anchored with one of the support arms, where two ends of a step shaft in the sector gear and two ends of the pinion are respectively axially arranged on the other of the support arms of the fixed support and the gear limit support.

In a preferred embodiment of the present invention, the unlocking maintenance and tolerance expansion structure submodule includes:

a connecting rod, where one end of the connecting rod is hinged with the easy-entry unlocking arm;

a connecting support assembly, axially arranged on one of the support arms of the fixed support, where the connecting support assembly is hinged with the other end of the connecting rod, and the easy-entry unlocking arm drives the connecting support assembly to rotate through the connecting rod; and a trigger roller, fixed to the connecting support assembly, where the trigger roller swings with the rotation of the connecting support assembly, the trigger roller is rotatable under the action of friction, and the trigger roller fits in with a front holder in the slide rail assemblies for unlocking limit maintenance when the seat is in an easy-entry state and slides forward.

In a preferred embodiment of the present invention, the manual slide rail unlocking module includes a handle, an unlocking synchronization rod, and an unlocking rod. The unlocking synchronization rod is fixedly connected to the handle, one end of the unlocking rod is fixedly connected to the unlocking synchronization rod, and an end of the unlocking synchronization rod is axially arranged on a support arm of the fixed support through a rotary support cover. An unlocking head is arranged on the other end of the unlocking rod, and when a passenger requires unlocking during comfort adjustment of the seat, the unlocking head acts on the stop adjustment surface on the U-shaped unlocking support assembly to drive the U-shaped unlocking support assembly to move, so that the easy-entry adjustment surface acts on the unlocking pins of the slide rail locking mechanisms in the slide rail assemblies to unlock the slide rail locking mechanisms.

Since the above technical solution is used, compared with the existing easy-entry mechanism, the present invention has the following advantages.

1. The modular design facilitates manufacturing, mounting, and replacement and does not affect the existing slide rail manufacturing process.

2. The mutual independent unlocking of the slide rail locking mechanisms by the easy-entry adjustable seat and the manual unlocking of the slide rail locking mechanisms by the handle during the seat comfort adjustment can be realized. In this way, the handle of the manual slide rail unlocking module is not tilted upward during the unlocking of the slide locking mechanism by the easy-entry adjustable seat, which saves space to the maximum extent and avoid the impact on the appearance. In addition, the comfort adjustment slide rail unlocking function and the easy-entry slide rail unlocking function are independent of each other, which is beneficial to the adjustment and control of the function.

3. In the present invention, during use of the easy-entry adjustable seat, the unlocking force of the unlocking cable acts on the easy-entry adjustment surface on the U-shaped unlocking support assembly in the slide rail parallel-unlocking mechanism submodule through the pinion on the cable support assembly in the unlocking force and displacement adjustment mechanism submodule, the sector gear, and the easy-entry unlocking surface on the easy-entry unlocking arm in the easy-entry unlocking arm assembly, so as to drive the U-shaped unlocking support assembly to move and perform an easy-entry unlocking operation. The unlocking force is small, and the operation and the driving are convenient, so that a small power motor can be used for driving. In addition, the durability is improved. In addition, an unlocking travel is large, which effectively reduces the impact of components after loss. Moreover, by adjusting a transmission ratio between the pinion and the sector gear and a length of a cable support in the cable support assembly, so that the motors with the same power can match different types of slide rail assemblies, to achieve the slide rail easy-entry function of different slide rail assemblies. The same type of slide rail assembly may also match motors with different powers for driving, but also can match different driving forms such as a cable, a wire, a connecting rod, and the like.

4. The trigger roller is used to fit in with a holder in the slide rail assemblies for the unlocking limit maintenance, the original sliding friction is changed to rolling friction, the sliding force of the seat is reduced, and the convenience of passenger operation is improved.

5. By adjusting a mounting position of the pinion, the present invention can effectively avoid a failure of the slide rail easy-entry travel unlocking maintenance function, which is convenient for repair and maintenance.

6. In the present invention, through the rotation of the easy-entry unlocking arm in the unlocking force and displacement adjustment mechanism submodule by a certain angle and by using the four-bar linkage mechanism composed of the connecting rod and the connecting support assembly in the unlocking maintenance and tolerance expansion structure submodule, a range of angles from initial unlocking to complete unlocking of the slide rail locking mechanisms is enlarged, so as to absorb a larger Z-direction tolerance and cause the slide rail assemblies to be less prone to the impact of the Z-direction tolerance.

BRIEF DESCRIPTION OF THE DRAWINGS

FIG. 1 is a schematic diagram of a seat movement relationship with a PITCH (seat folding) function on the existing market.

FIG. 2a to FIG. 2d are schematic flowcharts showing that a second row of seats in an existing compact or hatchback model slides forward by a certain travel and then is turned up to make enough space for entry/exit of a passenger in the third row seating.

FIG. 9 is a schematic structural diagram of a fixed support of an easy-entry module according to the present invention.

FIG. 10 is a schematic structural diagram of a cable limit assembly of an easy-entry module according to the present invention.

DETAILED DESCRIPTION

The present invention is further described below with reference to the accompanying drawings and specific implementations.

Figure 3:
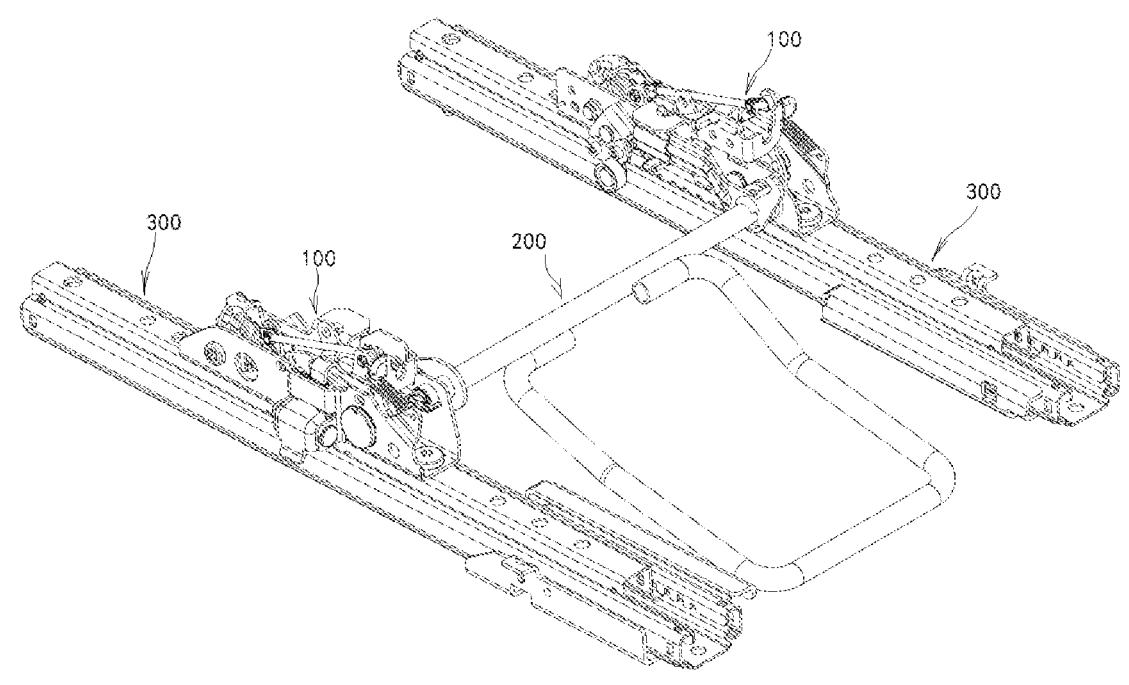
FIG. 3 is a schematic diagram of a modular and electromechanically integrated easy-entry mechanism applied to an H-shaped slide rail according to the present invention.

Referring to FIG. 3, a modular and electromechanically integrated easy-entry mechanism provided in the present invention is applied to an H-shaped slide rail. The H-shaped slide rail has two sets of slide rail assemblies 300 with the same structure, which are respectively a left slide rail assembly and a right slide rail assembly.

The modular and electromechanically integrated easy-entry mechanism includes two sets of easy-entry modules 100 and one set of manual slide rail unlocking modules 200. The two sets of easy-entry modules 100 and one set of manual slide rail unlocking modules 200 are manufactured independently of the two sets of slide rail assemblies 300. The easy-entry mechanism is modularly designed, is easy to manufacture, mount, and replace, and does not affect the existing slide rail assembly manufacturing process, so that the existing slide rail assemblies can be produced according to an established process route and tempo without being disrupted.

The two sets of easy-entry modules 100 are respectively mounted to the two sets of slide rail assemblies 300, and the one set of manual slide rail unlocking modules 200 are arranged between the two sets of easy-entry modules 100.

Figure 4:
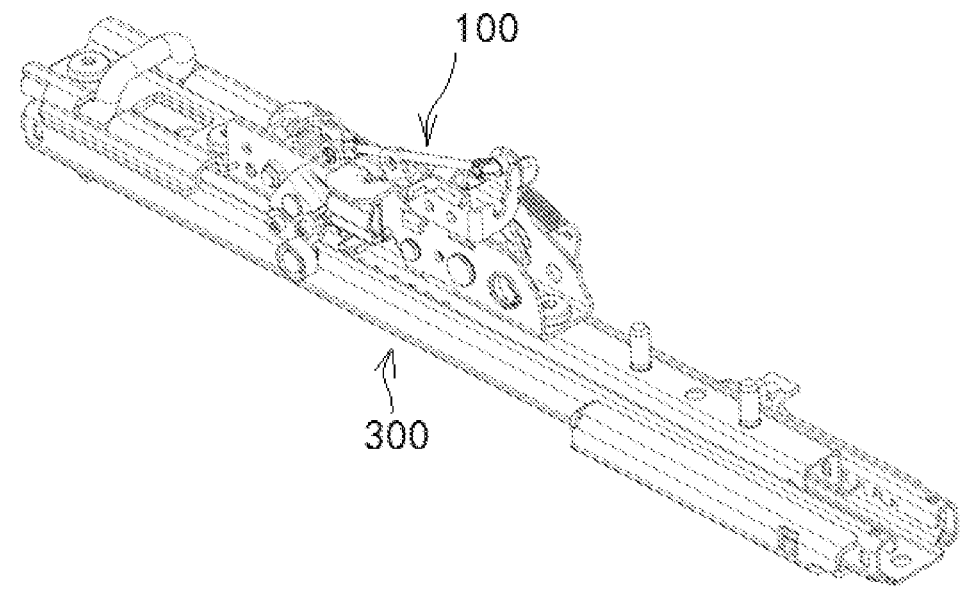
FIG. 4 is a schematic diagram of a modular and electromechanically integrated easy-entry mechanism applied to a single slide rail according to the present invention.

Referring to FIG. 4, a modular and electromechanically integrated easy-entry mechanism provided in the present invention is applied to a single slide rail assembly. The modular and electromechanically integrated easy-entry mechanism includes one set of easy-entry modules 100 and one set of manual slide rail unlocking modules 200.

The one set of easy-entry modules 100 are mounted to the one set of slide rail assemblies 300. The mounting mode between the easy-entry module 100 and the single slide rail assembly and a linkage mode between the manual slide rail unlocking module and the easy-entry module 100 are described in detail below.

Figure 5:
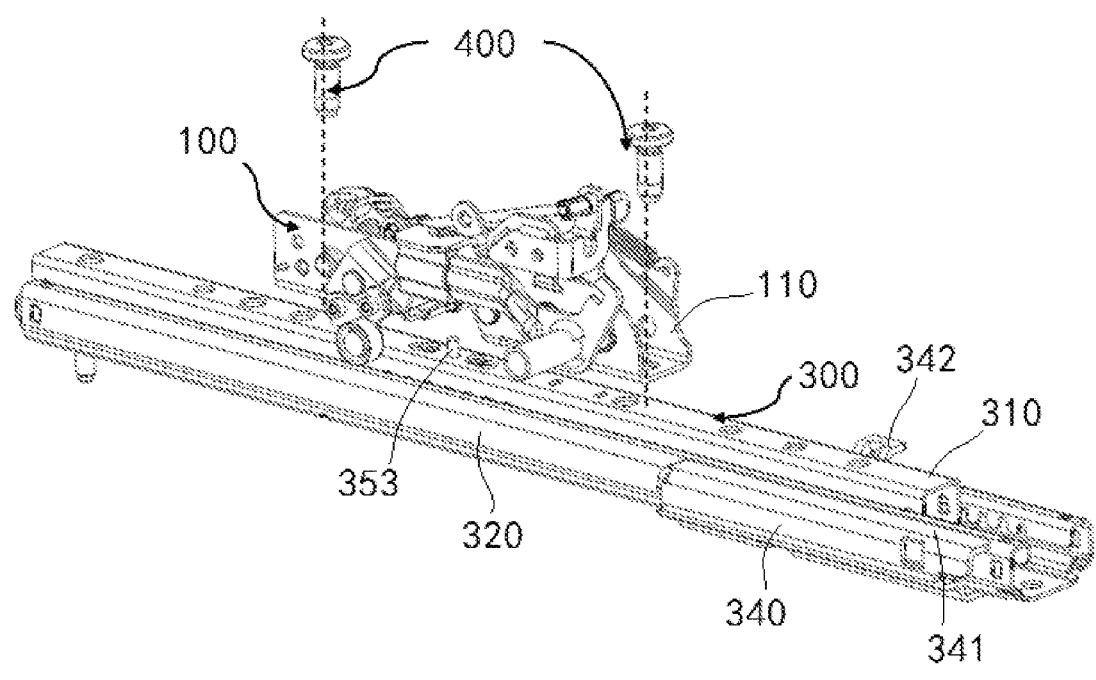
FIG. 5 is a schematic diagram showing a state in which an easy-entry module of a modular and electromechanically integrated easy-entry mechanism is mounted on slide rail assemblies according to the present invention.

Referring to FIG. 5, a fixed support 110 in the easy-entry module 100 is mounted to upper slide rails 310 in the slide rail assemblies 300 by using fasteners, such as a pair of bolts 400.

Figure 6:
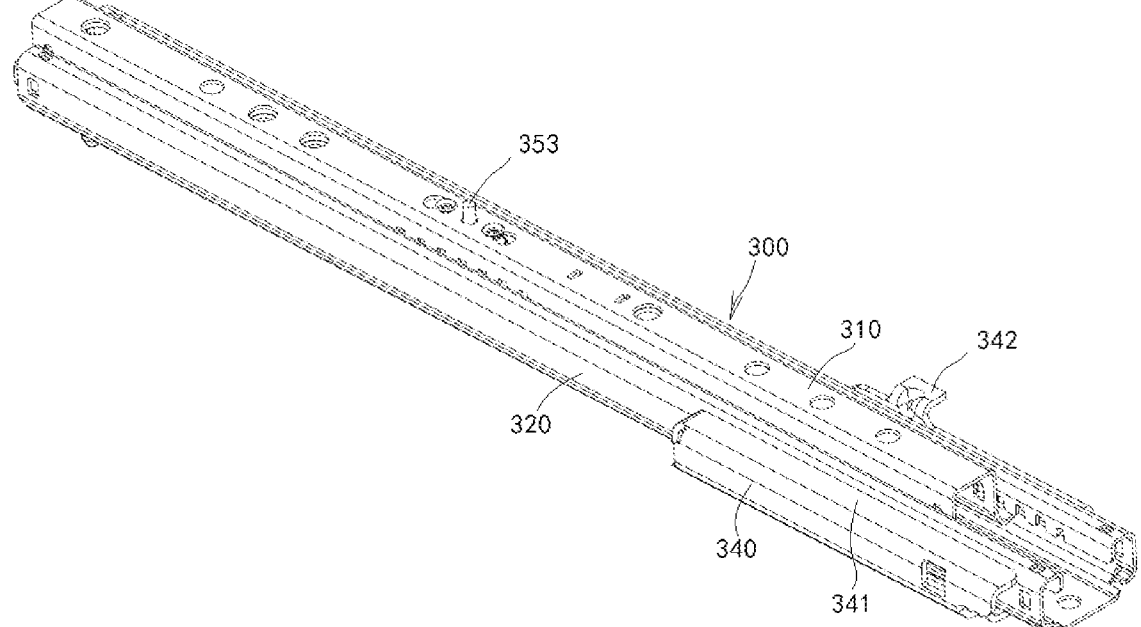
FIG. 6 is a schematic structural diagram of the slide rail assemblies shown in FIG. 5.
Figure 7:
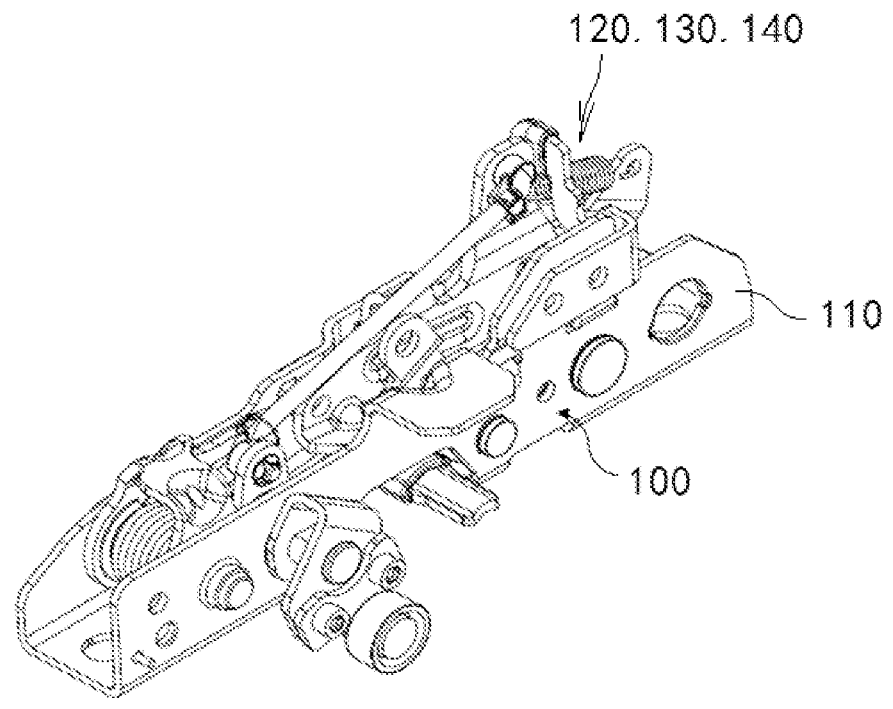
FIG. 7 is a schematic structural diagram of an easy-entry module of a modular and electromechanically integrated easy-entry mechanism according to the present invention.
Figure 25:
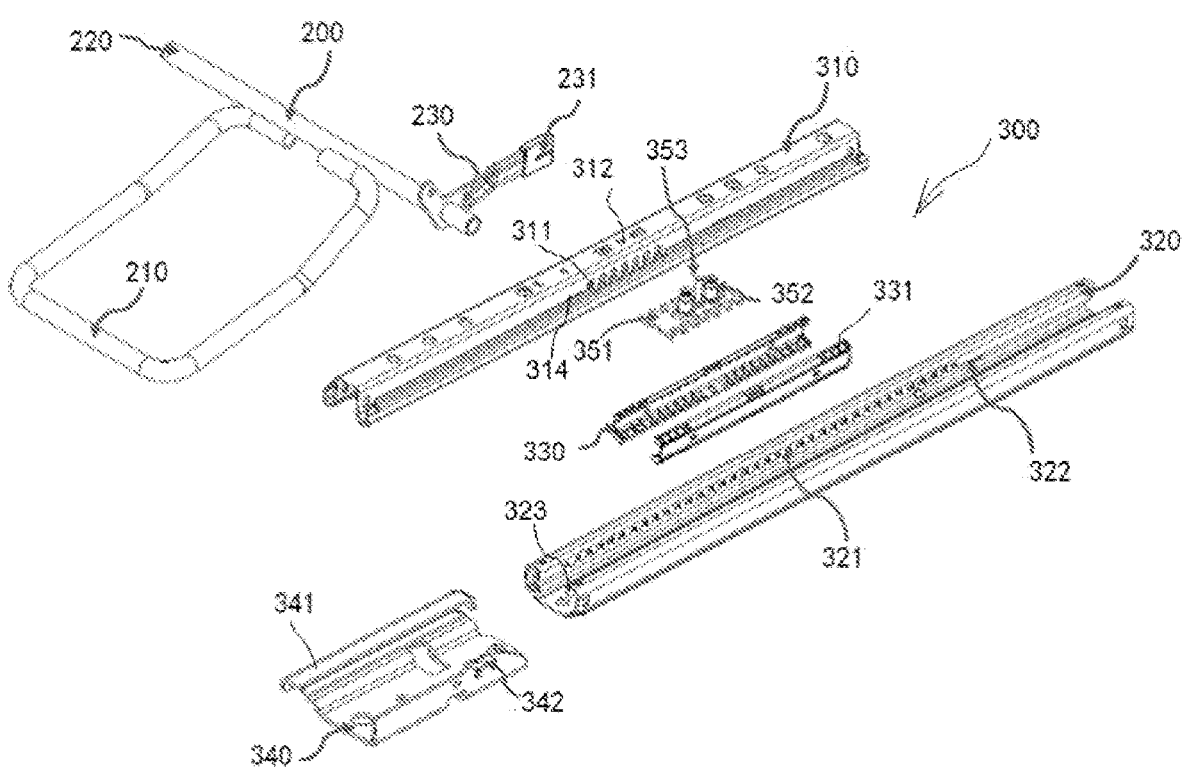
FIG. 25 is a schematic exploded view of a manual slide rail unlocking module and slide rail assemblies according to the present invention.
Figure 26:
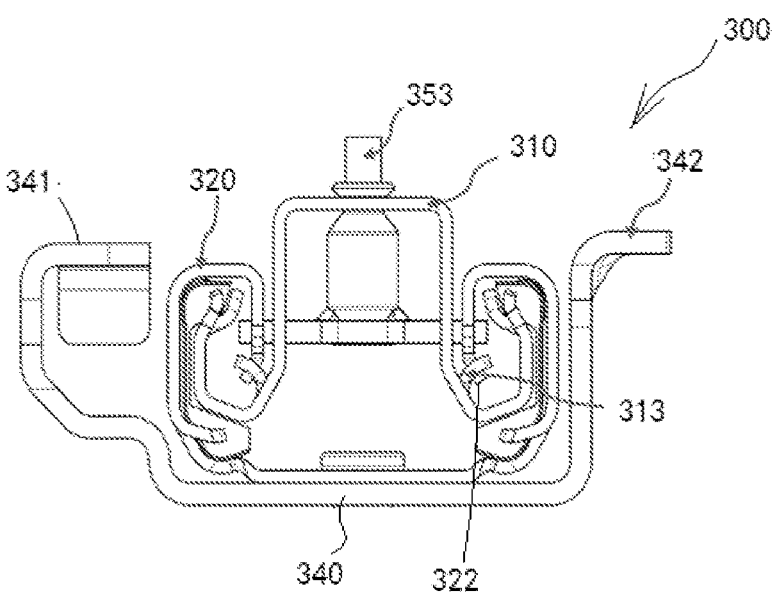
FIG. 26 is a cross-sectional view of slide rail assemblies according to the present invention.

Referring to FIG. 6, FIG. 25, and FIG. 26, the slide rail assemblies 300 include upper slide rails 310, lower slide rails 320, a pair of ball holders 330, several balls 331, a holder 340, and a toothed plate 351, a pair of locking springs 352, and an unlocking pin 353 forming the slide rail locking mechanisms. The upper slide rails 310 and the lower slide rails 320 are slidably configured together by the pair of ball holders 330 and the several balls 331, and the pair of ball holders 330 hold these balls 331.

Locking teeth on the toothed plate 351 are inserted through an upper rail tooth window 311 in the upper slide rails 310 into a lower rail tooth window 321 in the lower slide rail 320. A lower end of the unlocking pin 353 is fixed to the toothed plate 351, and an upper end of the unlocking pin 353 is exposed from an upper surface of the upper guide rail 310 by extending through an unlocking pin hole 312 on the upper guide rail 310. The pair of locking springs 352 are configured between the toothed plate 351 and the upper slide rails 310. During locking, the pair of locking springs 352 drive the toothed plate 351 to move upward, and the locking teeth on the toothed plate 351 and the lower rail tooth window 321 in the lower slide rails 320 lock the upper slide rails 310 to the lower slide rails 320. During unlocking, the unlocking pins 353 are driven downward to move downward by an unlocking force and drive the toothed plate 351 to move downward by overcoming the resistance of the pair of locking springs 352, so that the locking teeth on the toothed plate 351 exit the lower rail tooth window 321 in the lower slide rails 320 and the upper rail tooth window 311 in the upper guide rails 310, so as to realize the unlocking between the upper slide rails 310 and the lower slide rails 320. The upper slide rails 310 and the lower slide rails 320 can slide relative to each other after being unlocked, so that the seat can be adjusted forward and backward.

The holding support 340 is riveted to a front end of the lower slide rail 320. An unlocking holding surface 341 is arranged on a side of the holding support 340 parallel to an axial direction, and a comfort adjustment front travel stop 342 is arranged on the other side of the holding support 340 parallel to the axial direction. The seat is limited from sliding backward by a rear upper stop 313 on the upper slide rails 310 and a rear lower stop 322 on the lower slide rail 320, and the forward movement of the seat is limited to its comfortable position through fitting of a stop 121a on a stop support 121 in the slide rail parallel-unlocking mechanism submodule 120 (refer to FIG. 13) and the comfort adjustment front travel stop 342 on the holding support 340.

Still referring to FIG. 25, the manual slide rail unlocking module 200 includes a handle 210, an unlocking synchronization rod 220, and an unlocking rod 230. The unlocking synchronization rod 220 is fixedly connected to the handle 210, such as by welding. One end of the unlocking rod 230 is fixedly connected to the unlocking synchronization rod 220, such as by welding. The end of the unlocking synchronization rod 220 is axially arranged in an unlocking synchronization rod shaft hole 111a of a support arm 111 of the fixed support 110 through a rotary support cover 240 (refer to FIG. 8). A plastic unlocking head 231 is sleeved on the other end of the unlocking rod 230. When the passenger requires unlocking during comfort adjustment of the seat, the unlocking head 231 acts on a stop adjustment surface 122aa of the U-shaped unlocking support 122a of the U-shaped unlocking support assembly 122 (refer to FIG. 8, FIG. 13, and FIG. 14) to drive the U-shaped unlocking support assembly 122 to move. Further, an easy-entry adjustment surface 122ab on the U-shaped unlocking support 122a of the U-shaped unlocking support assembly 122 (see FIG. 13) acts on the unlocking pins 353 in the slide rail locking mechanisms of the slide rail assemblies to unlock the slide rail locking mechanisms.

In this way, the easy-entry module 100 and the manual slide rail unlocking module 200 may both act independently on the unlocking pins 353 in the slide rail locking mechanisms of the slide rail assemblies to unlock the slide rail locking mechanisms.

Referring to FIG. 8, FIG. 9, and FIG. 13 to FIG. 22, the easy-entry module 100 further includes a slide rail parallel-unlocking mechanism submodule 120, an unlocking force and displacement adjustment mechanism submodule 130, an unlocking maintenance and tolerance expansion structure submodule 140, a cable limit assembly 150, and an easy-entry return spring 160 mounted to the fixed support 110. An easy-entry unlocking cable is driven manually or by electric power to drive the unlocking force and displacement adjustment mechanism submodule 130 to move and further drive the slide rail parallel-unlocking mechanism submodule 120 and the unlocking maintenance and tolerance expansion structure submodule 140 to be linked to each other to achieve easy-entry unlocking.

The easy-entry unlocking may be realized by a cable or a wire.

The cable limit assembly 150 performs unlocking limit maintenance on the unlocking force and displacement adjustment mechanism submodule 130. The easy-entry return spring 160 drives the unlocking force and displacement adjustment mechanism submodule 130 to return and thereby drives the slide rail parallel-unlocking mechanism submodule 120 and the unlocking maintenance and tolerance expansion structure submodule 130 to return. The slide rail parallel-unlocking mechanism submodule 120 drives the unlocking pins 353 in the slide rail locking mechanisms to unlock.

Structures and operating principles of the slide rail parallel-unlocking mechanism submodule 120, the unlocking force and displacement adjustment mechanism submodule 130, and the unlocking maintenance and tolerance expansion structure submodule 140 are described in detail below.

Referring to FIG. 8 and FIG. 11 to FIG. 14, the slide rail parallel-unlocking mechanism submodule 120 mainly includes a U-shaped unlocking support assembly 122 and an unlocking return spring 123.

The U-shaped unlocking support assembly 122 includes a U-shaped unlocking support 122a, an axially arranged bolt 122b, a sleeve 122c, two bushings 122d and 122e, and a plastic unlocking head 122f.

Figure 14:
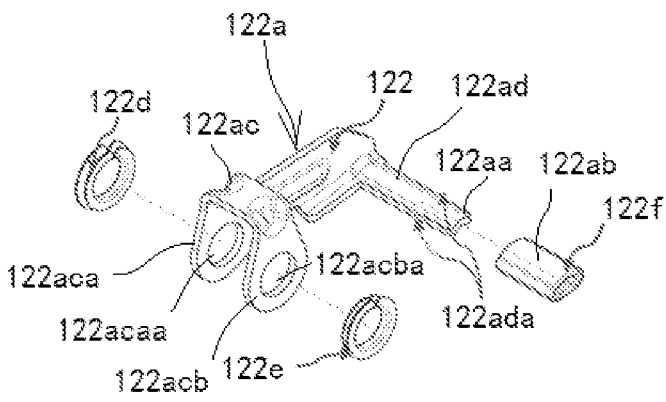
FIG. 14 is a schematic exploded view of a U-shaped unlocking support assembly of a slide rail parallel-unlocking mechanism submodule according to the present invention.
Figure 15:
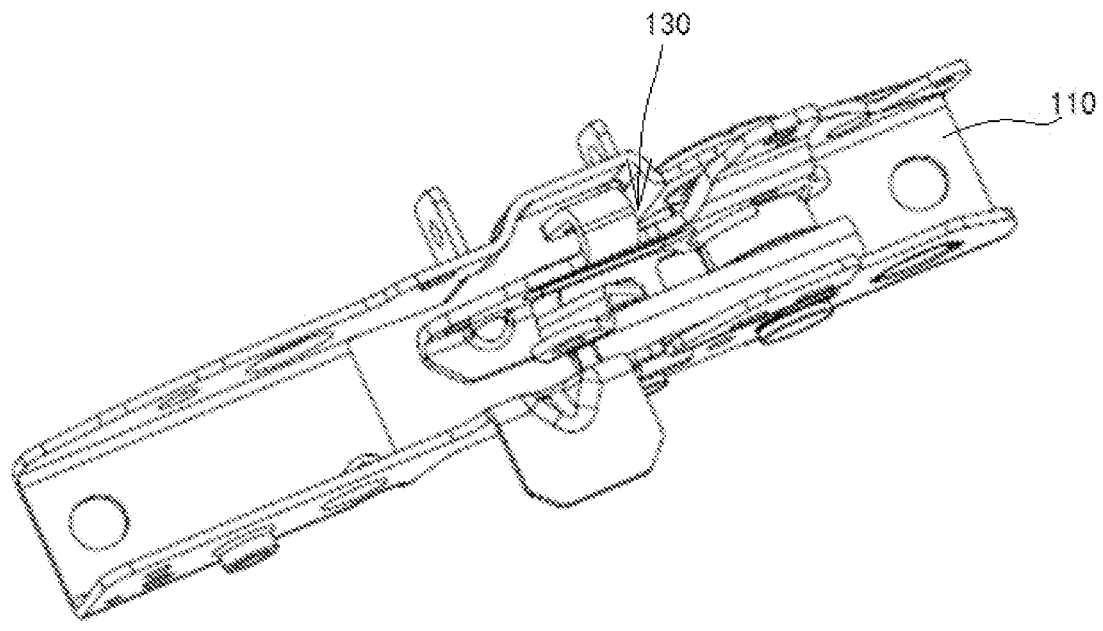
FIG. 15 is a schematic three-dimensional view of an unlocking force and displacement adjustment mechanism submodule of an easy-entry module mounted on a fixed support according to the present invention.
Figure 16:
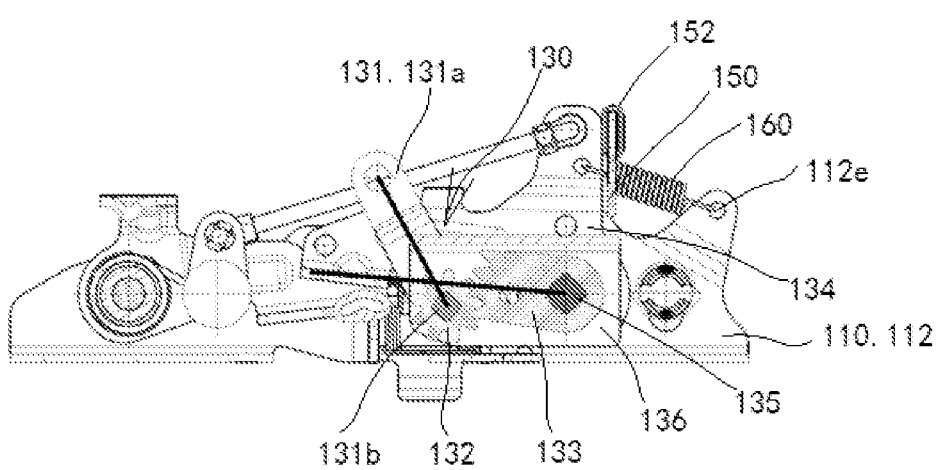
FIG. 16 is a schematic diagram of a driving principle of an unlocking force and displacement adjustment mechanism submodule of an easy-entry module according to the present invention.
Figure 17:
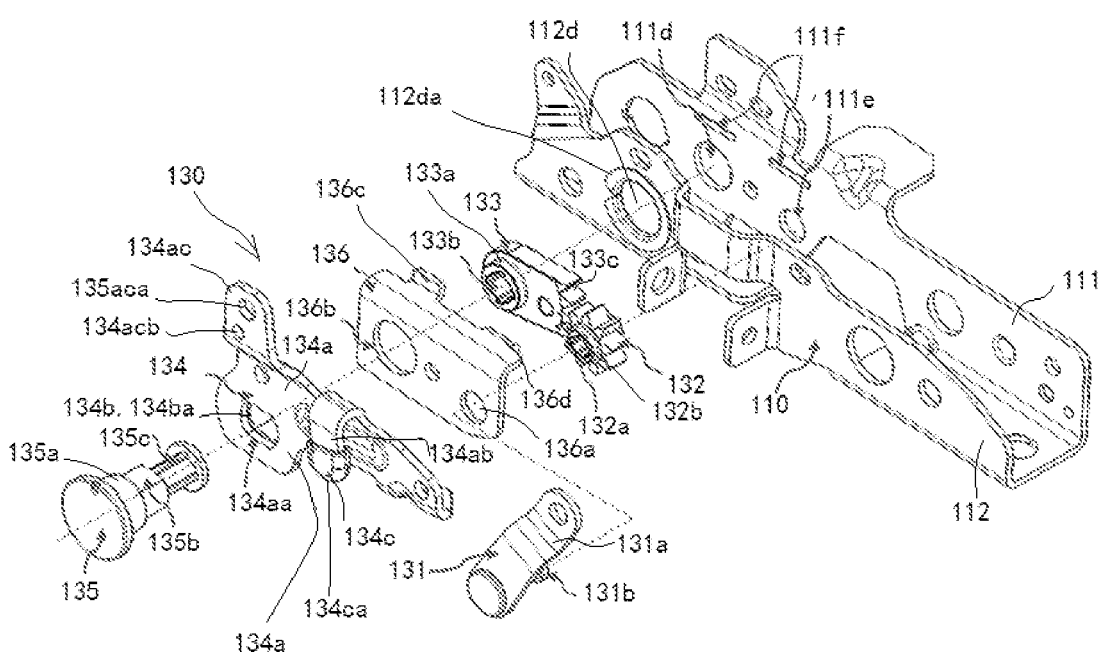
FIG. 17 is a schematic exploded view of an unlocking force and displacement adjustment mechanism submodule and a fixed support of an easy-entry module according to the present invention.
Figure 18:
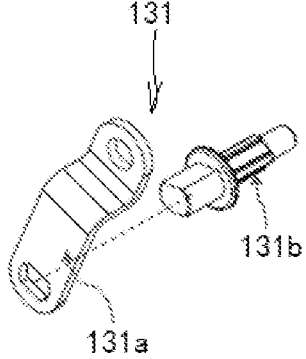
FIG. 18 is a schematic exploded view of a cable support assembly of an unlocking force and displacement adjustment mechanism submodule according to the present invention.

Specifically, referring to FIG. 14, an axially arranged end 122ac having a U-shaped structure is arranged on an end of the U-shaped unlocking support 122. Two axially arranged arms 122aca and 122acb are arranged on the axially arranged end 122ac having a U-shaped structure. Shaft holes 122acaa and 122acba are respectively formed on the two axially arranged arms 122aca and 122acb. The shaft holes 122acaa and 122acba on the two axially arranged arms 122aca and 122acb are coaxial, and the two bushings 122d and 122e are respectively anchored in the shaft holes 122acaa and 122acba.

A plastic unlocking head support arm 122ad is arranged on the other end of the U-shaped unlocking support 122a. A stop adjustment surface 122aa is arranged on an end of the plastic unlocking head support arm 122ad. A limiting engagement groove 122ada is arranged on each of two sides of the plastic unlocking head support arm 122ad parallel to the axial direction. The plastic unlocking head 122f is sleeved on the plastic unlocking head support arm 122ad by interference fit, and the plastic unlocking head 122f is prevented from disengaging through the two limiting engagement grooves 122ada. The upper surface of the plastic unlocking head 122f forms the easy-entry adjustment surface 122ab.

Figure 13:
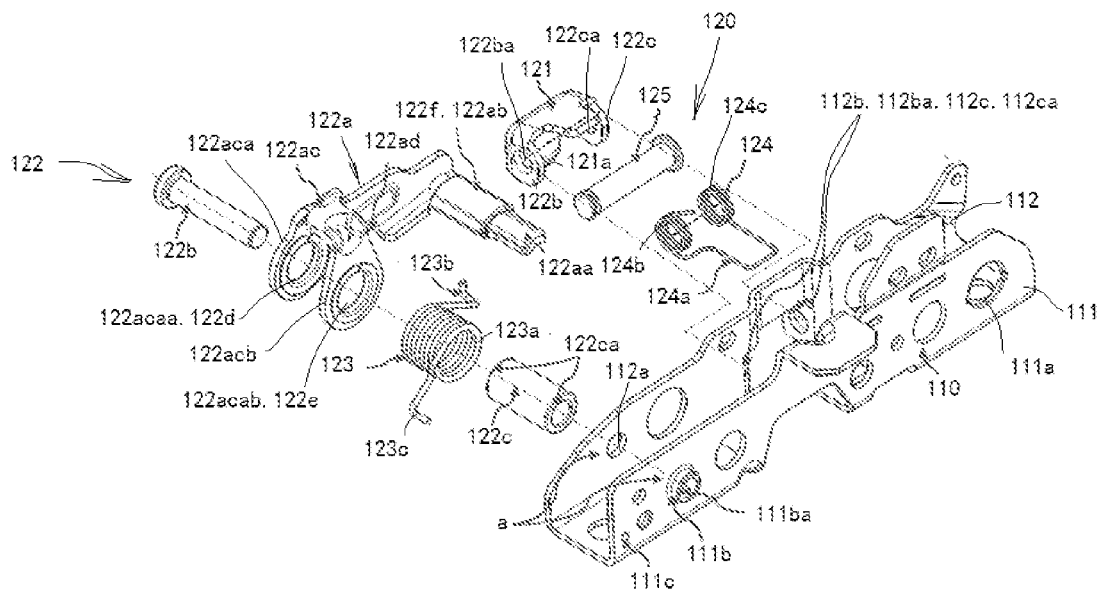
FIG. 13 is a schematic exploded view of a slide rail parallel-unlocking mechanism submodule and a fixed support of an easy-entry module according to the present invention.

Referring to FIG. 13, draw holes 111b and 112a are respectively formed on the support arms 111 and 112 of the fixed support 110 corresponding to positions at which the U-shaped unlocking support assembly 122 is axially arranged. The two draw holes 111b and 112a are coaxial, and internal threads 111ba are arranged in one of the draw holes 111b.

The axially arranged end 122ac having a U-shaped structure of the U-shaped unlocking support 122a is axially arranged between the two support arms 111 and 112 of the fixed support 110 by extending through the shaft hole 122acaa, the draw hole 112a, the unlocking return spring 123, the other shaft hole 122acab, and the axially arranged bolt 122b of the other draw hole 111b in sequence. A threaded end of the axially arranged bolt 122b is screwed on the internal threads 111*ba* of the other draw hole 111*b*, and the axially arranged bolt 122*b* is tightened to meet a torque requirement. The axially arranged end 122*ac* having a U-shaped structure of the U-shaped unlocking support 122*a* rotates about the axially arranged bolt 122*b*.

In order to prevent the U-shaped unlocking support 122*a* from being unable to rotate resulting from retraction of the two support arms 111 and 112 of the fixed support 110 after the axially arranged bolt 122*b* is tightened, a sleeve 122*c* is arranged on the axially arranged bolt 122*b*, and two ends 122*ca* of the sleeve 122*c* in an axial direction extend through the two shaft holes 122*acaa* and 122*acab* and contact inner surfaces *a* of the two support arms 111 and 112 of the fixed support 110.

The unlocking return spring 123 is a torsion spring. A ring portion 123*a* of the torsion spring is sleeved on the sleeve 122*c* and located between the two axially arranged arms 122*aca* and 122*acb*. A spring hook 123*b* on one end of the torsion spring is hooked in a spring engagement groove 122*ad* in the U-shaped unlocking support 122*a*, and a spring hook 123*c* on the other end is hooked in a spring engagement hole 111*c* on the support arm 111. In this way, the two ends of the unlocking return spring 123 respectively act on the U-shaped unlocking support assembly 122 and the fixed support 110.

The slide rail parallel-unlocking mechanism submodule 120 further includes a stop support 121, a stop support return spring 124, and a rotary shaft 125.

A stop 121*a* is arranged at a bottom of the stop support 121. Turnups 121*b* and 122*c* are respectively arranged on front and rear sides of the stop 121*a*, and shaft holes 121*ba* and 121*ca* are respectively arranged on the turnups 121*b* and 121*c*. A pair of stop support turnups 112*b* and 112*c* are arranged on the support arm 112 of the fixed support 110 corresponding to positions at which the stop support 121 is axially arranged. Stop connecting holes 112*ba* and 112*ca* are respectively formed on the stop support turnups 112*b* and 112*c*.

The stop support return spring 124 has a U-shaped spring arm 124*a* and torsion spring portions 124*b* and 124*c* located at two ends of the U-shaped spring arm 124*a*.

The stop support 121 is located between the pair of stop support turnups 112*b* and 112*c*. The rotary shaft 125 is limited through riveting by extending through the stop connecting hole 112*ca*, the shaft hole 121*ca*, the torsion spring portions 124*b* and 124*c*, the shaft hole 121*ba*, and the stop connecting hole 112*ba* in sequence, so that the stop support 121 is axially arranged between the pair of stop support turnups 112*b* and 112*c* on the support arm 112 of the fixed support 100. The ends of the two torsion spring portions 124*b* and 124*c* act on the stop support 121. The U-shaped spring arm 124*a* acts on the support arm 112 of the fixed support 100 corresponding to the position at which the stop support 121 is axially arranged.

The operating principle of the slide rail parallel-unlocking mechanism submodule 120 is as follows. The easy-entry unlocking force is applied to the easy-entry adjustment surface 122*ab* of the plastic unlocking head 122*f* during the easy-entry unlocking. Through the easy-entry adjustment surface 122*ab* and the plastic unlocking head support arm 122*ad*, the U-shaped unlocking support 122*a* rotates clockwise about the axially arranged bolt 122*b*, so that the easy-entry adjustment surface 122*ab* acts on the unlocking pins 353 in the slide rail locking mechanisms in the slide rail assemblies to unlock the slide rail locking mechanisms. In this case, the unlocking return spring 123 twists to accumulate energy. Once the easy-entry unlocking force on the easy-entry adjustment surface 122*ab* disappears, the unlocking return spring 123 releases energy and drives the U-shaped unlocking support 122*a* to rotate counterclockwise about the axially arranged bolt 122*b*, so that the easy-entry adjustment surface 122*ab* is out of contact with the unlocking pins 353 in the slide rail locking mechanisms in the slide rail assemblies, the unlocking pins 353 are reset, and the slide rail locking mechanisms return to the locked state (described previously). In addition, the easy-entry unlocking force is applied to the stop support 121 to drive the stop support 121 to rotate about the rotary shaft 125, so that the stop 121*a* on the stop support 121 is lifted upward, and the upper slide rails 310 in the slide rail assemblies 300 pass through the holder stop 342 on the holder 340 during sliding forward.

When the passenger requires unlocking during comfort adjustment of the seat, the handle 210 is lifted by hands, the handle 210 drives the unlocking synchronization rod 220 to rotate, and the rotating unlocking synchronization rod 220 drives the unlocking rod 230 to rotate clockwise. The unlocking head 231 of the unlocking rod 230 acts on the stop adjustment surface 122*aa* of the U-shaped unlocking support 122*a* of the U-shaped unlocking support assembly 122 (refer to FIG. 8, FIG. 13, and FIG. 14) to drive the U-shaped unlocking support assembly 122 to move. Further, the easy-entry adjustment surface 122*ab* on the U-shaped unlocking support 122*a* of the U-shaped unlocking support assembly 122 (see FIG. 13) acts on the unlocking pins 353 in the slide rail locking mechanisms of the slide rail assemblies to unlock the slide rail locking mechanisms. In this case, the unlocking return spring 123 twists to accumulate energy. Once the handle is released and the unlocking return spring 123 releases energy and drives the U-shaped unlocking support 122*a* to rotate counterclockwise about the axially arranged bolt 122*b*, the easy-entry adjustment surface 122*ab* is out of contact with the unlocking pins 353 in the slide rail locking mechanisms in the slide rail assemblies, the unlocking pins 353 are reset, and the slide rail locking mechanisms return to the locked state (described previously). In addition, the unlocking rod 230 is also reset synchronously, and the handle 210 returns to the initial state.

In the present invention, the seat comfort adjustment process is independent of the seat easy-entry adjustment process, so that the handle 210 is not tilted upward during the seat easy-entry adjustment, which facilitates the arrangement of space under a seat cushion of the seat and enhances the durability of the entire structure.

Referring to FIG. 8 and FIG. 15 to FIG. 18, the unlocking force and displacement adjustment mechanism submodule 130 includes a cable support assembly 131, a pinion 132, a sector gear 133, an easy-entry unlocking arm assembly 134, a big gear rotating shaft 135, and a gear limit support 136.

The cable support assembly 131 includes a cable support 131*a* and a pinion shaft 131*b*. An upper end of the cable support 131*a* is connected to the easy-entry unlocking cable, and the pinion shaft 131 is fixed to a lower end of the cable support 131*a*. A step shaft 132*b* and a splined hole 132*a* are arranged on the pinion 132, and the step shaft 132*b* and the splined hole 132*a* are coaxial.

Big gear connecting holes 111*d* and 112*d* are arranged on the two support arms 111 and 112 of the fixed support 110. The two big gear connecting holes 111*d* and 112*d* are coaxial, and a bushing 112*da* is riveted in the big gear connecting hole 112*d*. In addition, a pinion connecting hole 111*e* and two limiting support square grooves 111*f* are further formed on the support arm 111.

A pinion shaft hole 136a and a sector gear shaft hole 136b are arranged on the gear limit support 136, and two limiting turnups 136c and 136d are arranged on the top of the gear limit support 136. One limiting turnup 136c extends upward and the other limiting turnup 136d extends downward.

Figure 19:
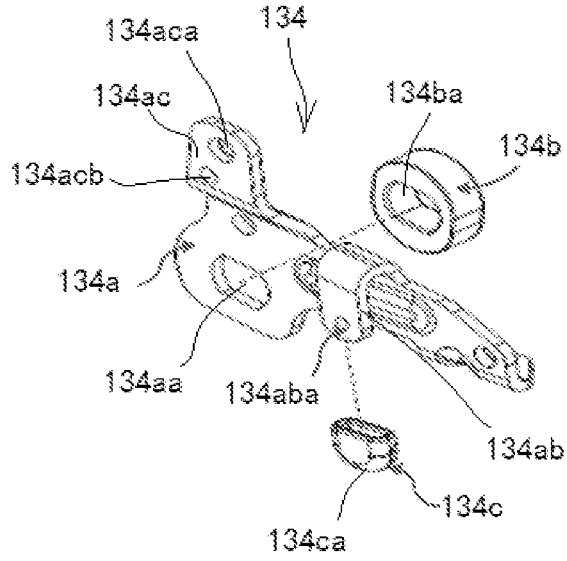
FIG. 19 is a schematic exploded view of an easy-entry unlocking arm assembly of an unlocking force and displacement adjustment mechanism submodule according to the present invention.
Figure 20:
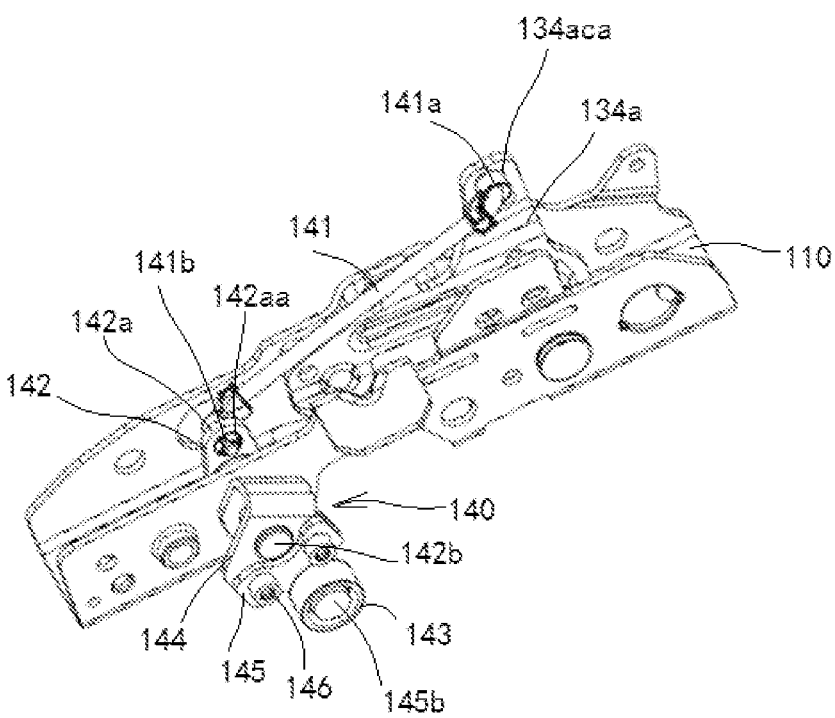
FIG. 20 is a schematic three-dimensional view of an unlocking maintenance and tolerance expansion structure submodule and a fixed support of an easy-entry module according to the present invention.
Figure 21:
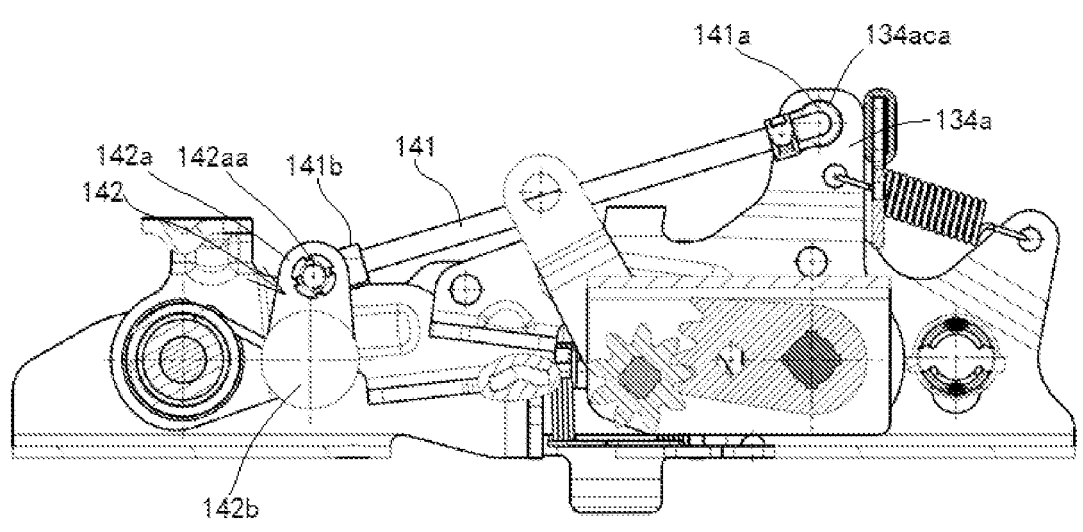
FIG. 21 is a schematic diagram of a driving principle of an unlocking maintenance and tolerance expansion structure submodule of an easy-entry module according to the present invention.

Referring to FIG. 19, the easy-entry unlocking arm assembly 134 includes an easy-entry unlocking arm 134a, a cushion block 134b, and an easy-entry plastic head 134c. A square hole 134aa and an easy-entry unlocking turnup 134ab are arranged on the easy-entry unlocking arm 134a, and a limiting portion 134ac is arranged. A connecting hole 134aca and a spring hook hole 134acb are formed on the limiting portion 134ac, and a limiting hole 134aba is arranged on the easy-entry unlocking turnup 134ab. A square hole 134ba of the same size as the square hole 134aa is also formed on the cushion block 134b. The cushion block 134b is welded to a side surface of the easy-entry unlocking arm 134a by arc welding, and the square hole 134ba on the cushion block is aligned with the square hole 134aa. The easy-entry plastic head 134c is sleeved on the easy-entry unlocking turnup 134ab by interference fit, and also fits in with the limiting hole 134aba on the easy-entry unlocking turnup 134ab through a bump on the easy-entry plastic head 134c, to prevent the easy-entry plastic head 134c from disengaging. An easy-entry unlocking surface 134ca is arranged on the easy-entry plastic head 134c.

A circular shaft 135a, a square step shaft 135b, and a splined shaft 135c are coaxially arranged on the big gear rotating shaft 135. The square step shaft 135d is located between the splined shaft 135c and the circular shaft 135a.

A step shaft 133a, a splined hole 133b, and a sector tooth portion 133c are also arranged on the sector gear 133. The step shaft 133a and the splined hole 133b are coaxial.

During the assembly, the cable support assembly 131, the pinion 132, the sector gear 133, the easy-entry unlocking arm assembly 134, and the gear limit support 136 are configured between the two support arms 111 and 112 of the fixed support 110. One end of the step shaft 132b of the pinion 132 and one end of the step shaft 133a of the sector gear 133 are respectively axially arranged in the pinion shaft hole 136a and the sector gear shaft hole 136b of the gear limit support 136. In addition, the other end of the step shaft 132b of the pinion 132 and the other end of the step shaft 133a of the sector gear 133 are respectively axially arranged in the pinion connecting hole 111e and the big gear connecting hole 111d of the support arm 111. In this way, the pinion 132 can be well meshed with the sector tooth portion 133c of the sector gear 133.

Then, the two limiting turnups 136c and 136d arranged on the top of the gear limit support 136 are respectively inserted into the two limiting support square grooves 111f on the support arm 111, and connected to the support arm 111 by welding or riveting. Therefore, the gear limit support 136 is anchored on the support arm 111, and the pinion 132 and the sector gear 133 are located between the gear limit support 136 and the support arm 111.

Next, the pinion shaft 131b on the cable support assembly 131 extends through the splined hole 132a in the pinion 132, and an end of the pinion shaft 131b extending through the splined hole 132a in the pinion 132 is anchored to prevent movement. The splined hole 132a in the pinion 132 is splined on the pinion shaft 131, so as to achieve the effect of synchronous rotation through spline fit.

Then, the big gear rotating shaft 135 extending through the bushing 112da, the square hole 134aa on the easy-entry unlocking arm 134a, the square hole 134ba on the cushion block 134b, and the splined hole 133b on the sector gear 133 in sequence, and an end of the big gear rotating shaft 135 extending through the splined hole 133b on the sector gear 133 is anchored to prevent movement. The circular shaft 135a on the big gear rotating shaft 135 rotatably fits in with an inner hole of the bushing 112da. The square step shaft 135c is in interference fit with the square hole 134aa on the easy-entry unlocking arm 134a and the square hole 134ba on the cushion block 134b. The splined hole 133b on the sector gear 133 is splined on the splined shaft 135b on the big gear rotating shaft 135, so that the big gear rotating shaft 135 synchronously rotates with the easy-entry unlocking arm 134a. In addition, the splined hole 133b on the sector gear 133 is splined on the splined shaft 135b on the big gear rotating shaft 135, so that the big gear rotating shaft 135 and the sector gear 133 can rotate synchronously through the spline fit.

Figure 8:
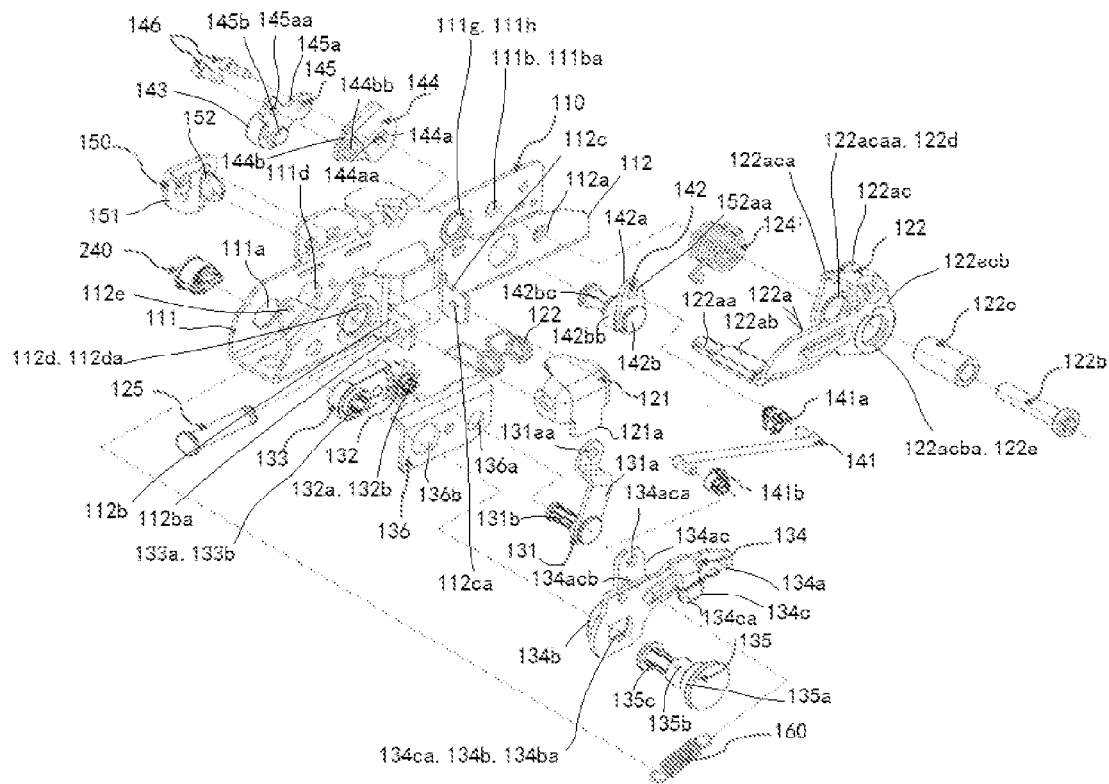
FIG. 8 a schematic exploded view of an easy-entry module of a modular and electromechanically integrated easy-entry mechanism according to the present invention.
Figure 11:
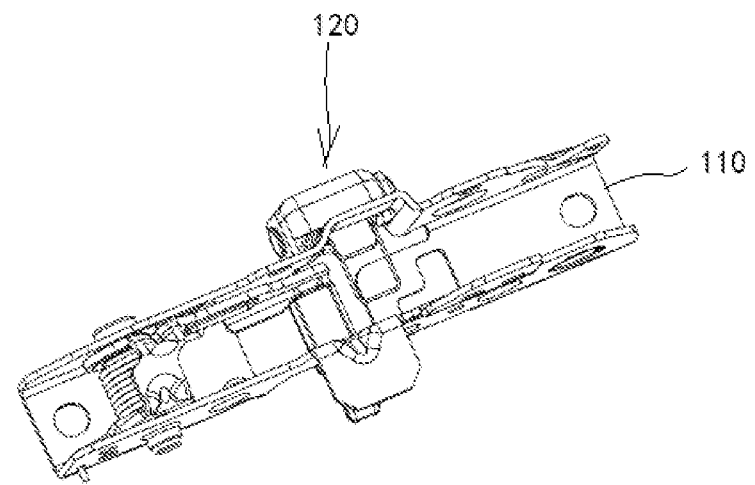
FIG. 11 is a schematic three-dimensional view of a slide rail parallel-unlocking mechanism submodule of an easy-entry module mounted on a fixed support according to the present invention.
Figure 12:
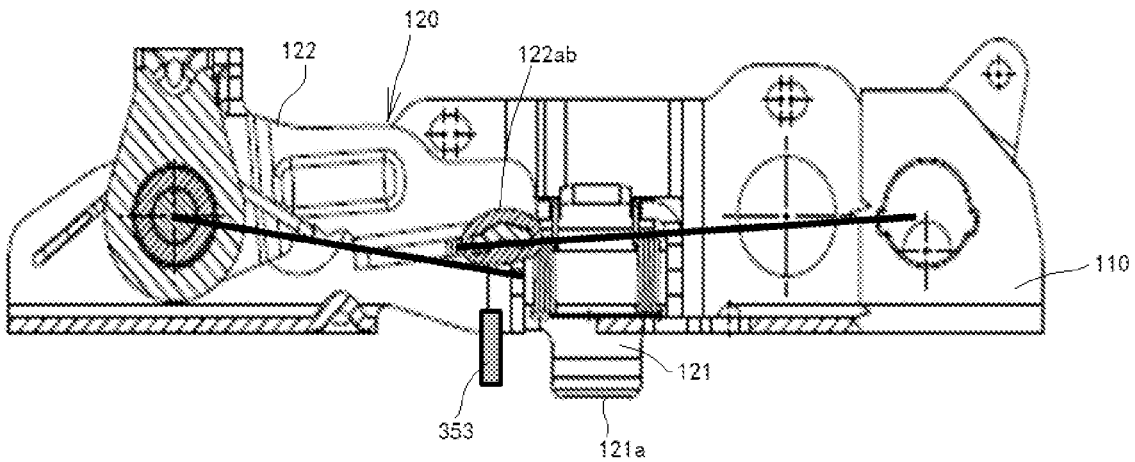
FIG. 12 is a schematic diagram of an unlocking principle of a slide rail parallel-unlocking mechanism submodule of an easy-entry module according to the present invention.
Figure 22:
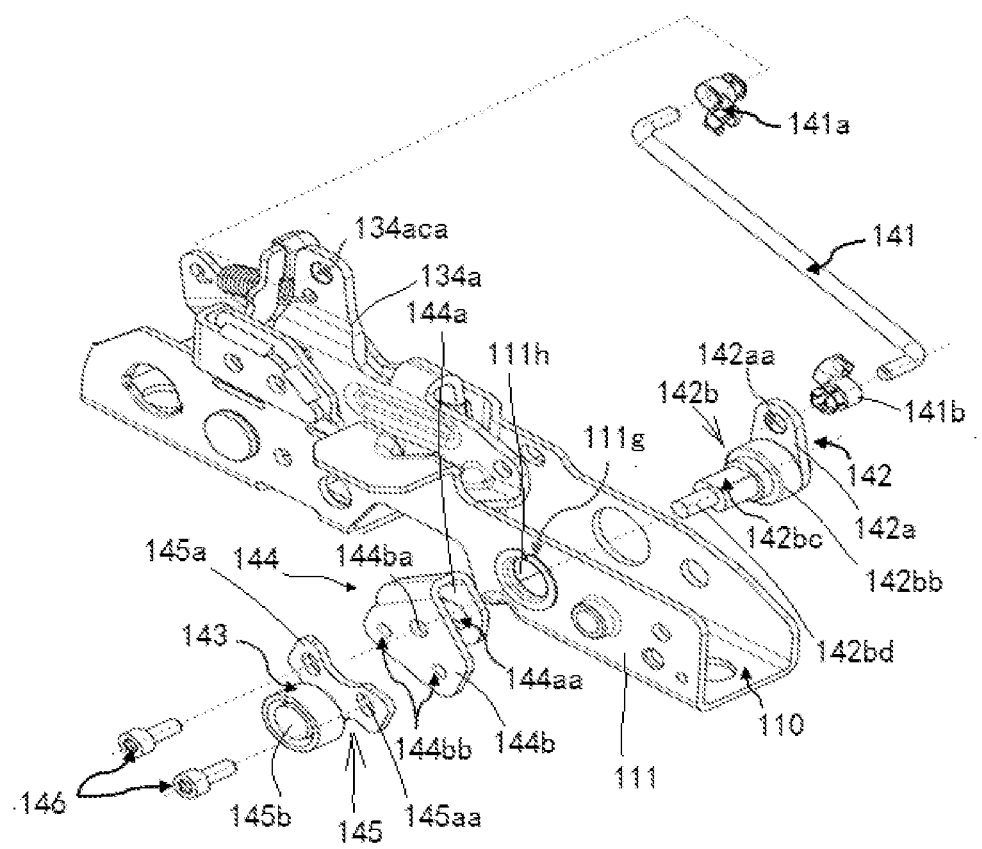
FIG. 22 is a schematic exploded view between an unlocking maintenance and tolerance expansion structure submodule and a fixed support of an easy-entry module according to the present invention.

Referring to FIG. 8, FIG. 10, and FIG. 22, the cable limit assembly 150 includes a cable limit support 151 and a limiting head 152 made of a plastic material. A limiting hole 151a is formed at a position of the cable limit support 151 on which the limiting head 152 is sleeved. After the limiting head 152 is sleeved on the cable limit support 151, a bump 152a in the limiting head 152 is in limiting-fit with the limiting hole 151a to prevent the limiting head 152 from disengaging.

The cable limit assembly 150 includes the cable limit support 151 welded to the support arm 111. The limiting head 152 contacts the limiting portion 134ac in the easy-entry unlocking arm 134a to limit an initial state position of the easy-entry unlocking arm 134a.

One end of the easy-entry return spring 160 is hooked in the spring hook hole 134acb of the easy-entry unlocking arm 134a, and the other end is hooked in the spring hook hole 112e of the support arm 112. The easy-entry return spring 160 pulls the easy-entry unlocking arm 134a to the initial position.

The operating principle of the unlocking force and displacement adjustment mechanism submodule 130 is as follows.

During the easy-entry unlocking, the easy-entry unlocking cable is driven manually or electrically, and the easy-entry unlocking cable pulls the cable support 131a in the cable support assembly 131. The cable support 131a drives the pinion 132 to rotate, and the rotating pinion 132 is meshed with the sector tooth portion 133c of the sector gear 133 to drive the sector gear 133 to rotate. The rotating sector gear 133 drives the big gear rotating shaft 135 to rotate through the splined shaft 135b on the big gear rotating shaft 135, and the big gear rotating shaft 135 drives the easy-entry unlocking arm 134a to rotate through the square step shaft 135c on the big gear rotating shaft. The rotating easy-entry unlocking arm 134a acts on the easy-entry adjustment surface 122ab of the plastic unlocking head 122f in the slide rail parallel-unlocking mechanism submodule 120 through the easy-entry unlocking surface 134ca of the easy-entry plastic head 134c. The U-shaped unlocking support 122a is caused to rotate clockwise about the axially arranged bolt 122b through the easy-entry adjustment surface 122ab and the plastic unlocking head support arm 122ad, so that the easy-entry adjustment surface 122ab acts on the unlocking pins 353 of the slide rail locking mechanisms in the slide rail assemblies to unlock the slide rail locking mechanisms. In addition, the rotating easy-entry unlocking arm 134a acts on the stop support 121 through the easy-entry unlocking surface 134ca of the easy-entry plastic head 134c, to drive the stop support 121 to rotate about the rotary shaft 125, so that the stop 121a on the stop support 121 is lifted upward, and the upper slide rails 310 in the slide rail assemblies 300 pass through the holder stop 342 on the holder 340 during sliding forward.

The unlocking force and displacement adjustment mechanism submodule 130 may adjust a transmission ratio between the pinion 132 and the sector gear 133 and a length of the cable support 131*a*, so that the motor with the same power can match different types of slide rail assemblies 300 to achieve the easy-entry function of slide rails. In addition, the same type of slide rail assembly 300 may also match the motors with different powers to achieve the easy-entry function of slide rails. Moreover, the cable support 131*a* can also match different driving forms such as a cable, a wire, a connecting rod, and the like.

Referring to FIG. 8 and FIG. 20 to FIG. 24, the unlocking maintenance and tolerance expansion structure submodule 140 shown in the figure mainly includes a connecting rod 141, a connecting support assembly 142, and a trigger roller 143. In addition, as a special example, a trigger roller fixing support 144 and a trigger roller riveting assembly 145 are further included.

Figure 23:
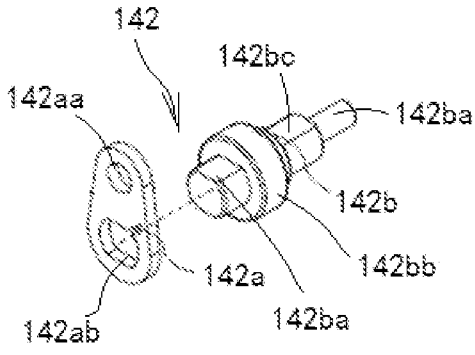
FIG. 23 is a schematic exploded view of a connecting support assembly of an unlocking maintenance and tolerance expansion structure submodule according to the present invention.

Referring to FIG. 23 particularly, the connecting support assembly 142 includes a connecting rod support 142*a* and a trigger roller rotating shaft 142*b*. A connecting hole 142*aa* and a square hole 142*ab* are formed on the connecting rod support 142*a*. The trigger roller rotating shaft 142*b* is formed by a first square shaft 142*ba*, a large circular shaft 142*bb*, a second square shaft 142*bc*, and a small circular shaft 142*bd* that are coaxial. A large circular shaft connecting hole 111*g* is formed on the support arm 111 to fit in with the large circular shaft 142*bb* on the trigger roller rotating shaft 142*b*, and a bushing 111*h* is riveted in the large circular shaft connecting hole 111*g*. The connecting rod support 142*a* is riveted to the first square shaft 142*ba* to form the connecting support assembly 142.

The trigger roller fixing support 144 has a U-shaped structure. A square hole 144*aa* is formed on a side wall 144*a* of the U-shaped structure adjacent to the support arm 111, a small circular hole 144*ba* and two draw holes are formed on a side wall 144*b* of the U-shaped structure away from the support arm 111, and internal screw holes 144*bb* are arranged in the two draw holes.

Figure 24:
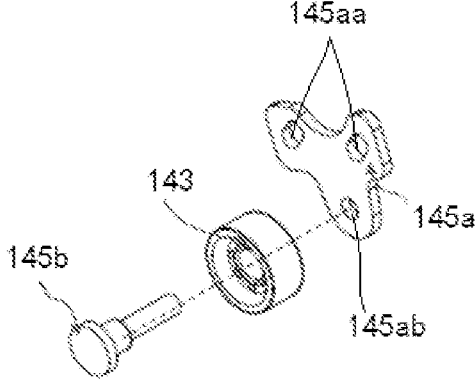
FIG. 24 is a schematic diagram of assembly between a trigger roller and a trigger roller support of an unlocking maintenance and tolerance expansion structure submodule according to the present invention.

Referring to FIG. 24 particularly, the trigger roller riveting assembly 145 includes a fixed support 145*a* and a rivet 145*b*. Two waist-shaped holes 145*aa* and a rivet hole 145*ab* are formed on the fixed support 145*a*. The rivet 145*b* is fixed to the fixed support 145*a* after extending through the trigger roller 143 and the rivet hole 145*ab*.

During the assembly of the unlocking maintenance and tolerance expansion structure submodule 140, the connecting support assembly 142 is placed between the support arms 111 and 112 of the fixed support 110, and the trigger roller rotating shaft 142*b* is caused to extend through the bushing 111*h*, and the large circular shaft 142*bb* is in rotation-fit with the bushing 111*h* after the trigger roller rotating shaft extends to a correct position. The second square shaft 142*bc* is threaded in the square hole 144*aa* on the trigger roller fixing support 144, and the small circular shaft 142*bd* is threaded in the small circular hole 144*ba* for riveting, so that the trigger roller fixing support 144 is fixedly connected to the trigger roller rotating shaft 142*b*, and the trigger roller fixing support 144 can be synchronously driven to rotate during rotation of the connecting support assembly 142.

Then two bolts 146 extend through the two waist-shaped holes 145*aa* on the fixed support 145*a* of the trigger roller riveting assembly 145, and then screwed into the inner screw holes 144*bb* of two draw holes on the trigger roller fixing support 144, so as to adjust the position of the trigger roller riveting assembly 145 and tighten the two bolts 146.

One end of the connecting rod 141 is hinged with a connecting hole 134*aca* of the easy-entry unlocking arm 134*a* through a plastic connector 141*a*, and the other end of the connecting rod 141 is hinged with the connecting hole 142*aa* on the connecting rod support 142*a* of the connecting support assembly 142 through a plastic connector 141*b*, so as to form a closed four-bar linkage mechanism.

The operating principle of the unlocking maintenance and tolerance expansion structure submodule 140 is as follows. During unlocking, the easy-entry unlocking arm 134*a* is rotated by a certain angle, and the connecting support assembly 142 is driven to rotate through the connecting rod 141. The rotating connecting support assembly 142 drives the trigger roller 143 to rotate upward by a certain angle through the trigger roller fixing support 144 and the trigger roller riveting assembly 145. When the trigger roller 143 contacts the unlocking holding surface 341 in the holder 340, the trigger roller 143 is held in the unlocked state by the unlocking holding surface 341. Further, the easy-entry unlocking arm 134*a* can remain unlocked through the trigger roller riveting assembly 145, the trigger roller fixing support 144, the connecting support assembly 142, and the connecting rod 141 even after being released by the easy-entry unlocking cable, which facilitates the sliding of the seat forward and backward. When the seat moves backward so that the trigger roller 143 leaves the unlocking holding surface 341 in the holder 340, the easy-entry unlocking arm 134*a* returns to the initial locked state under the action of the easy-entry return spring 160. The connecting support assembly 142 is driven to rotate through the connecting rod 141. The rotating connecting support assembly 142 drives the trigger roller 143 to rotate downward by a certain angle to return to the initial state through the trigger roller fixing support 144 and the trigger roller riveting assembly 145.

The unlocking maintenance and tolerance expansion structure submodule 140 has the following characteristics. The range of angles from the initial unlocking to the complete unlocking of the slide rail assemblies 300 is enlarged through the four-bar linkage mechanism formed by the easy-entry unlocking arm 134*a* with the connecting rod 141 and the connecting support assembly 142, so as to absorb a larger Z-direction tolerance and cause the slide rail assemblies to be less prone to the impact of the Z-direction tolerance.

Figure 27:
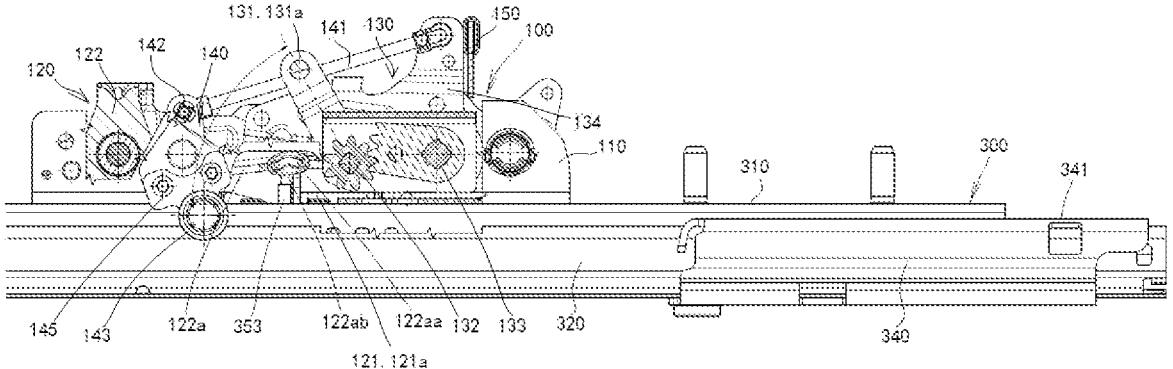
FIG. 27 is a schematic diagram showing a state in which a modular and electromechanically integrated easy-entry mechanism and slide rail assemblies are at an initial position according to the present invention.
Figure 28:
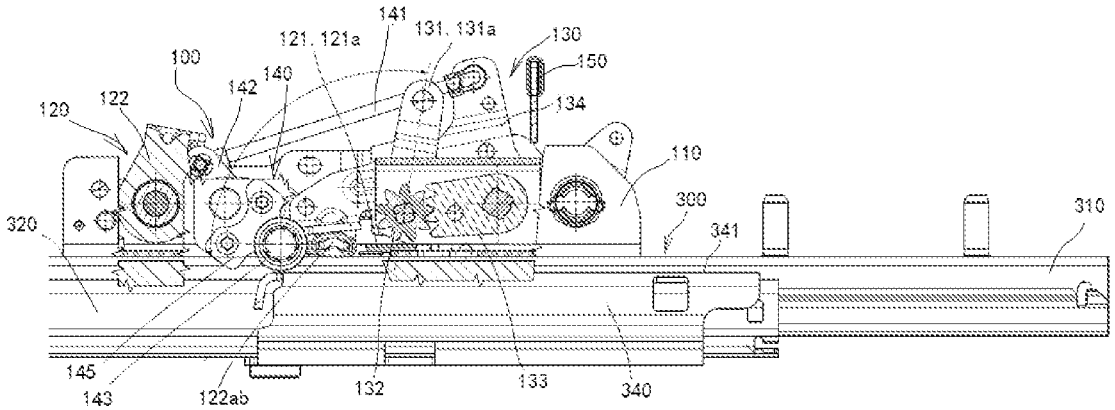
FIG. 28 is a schematic diagram showing a state in which a modular and electromechanically integrated easy-entry mechanism and slide rail assemblies are at an easy-entry start position according to the present invention.
Figure 29:
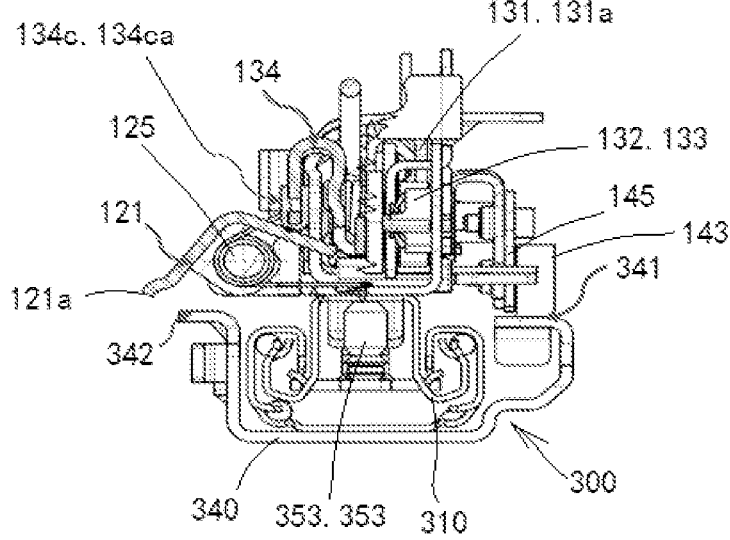
FIG. 29 is a side view of FIG. 28.
Figure 30:
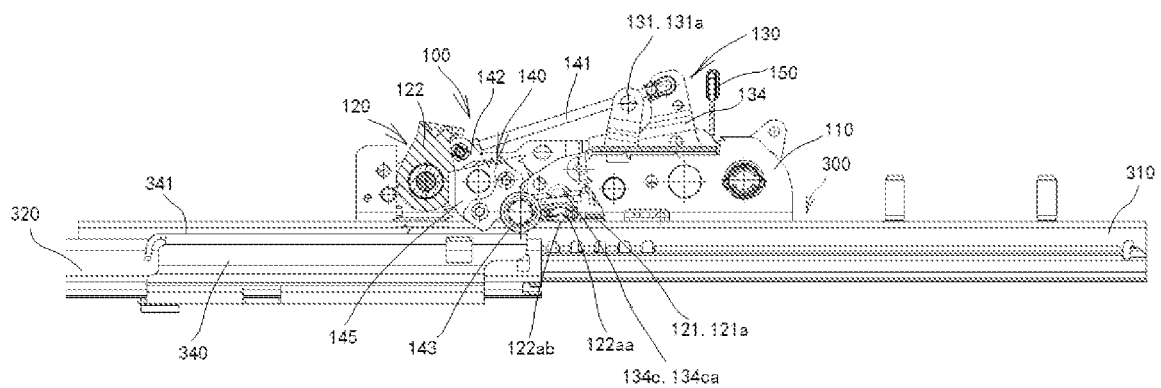
FIG. 30 is a schematic diagram showing a state in which a modular and electromechanically integrated easy-entry mechanism and slide rail assemblies are at a front-most position of an easy-entry travel according to the present invention.
Figure 31:
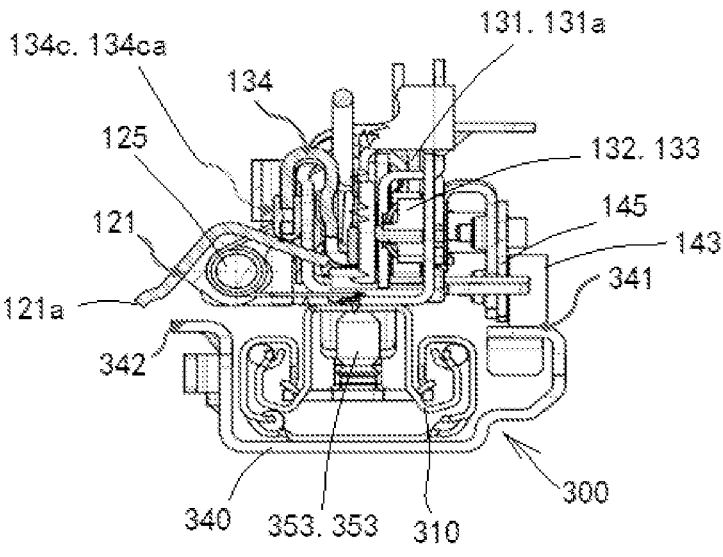
FIG. 31 is a side view of FIG. 30.

Referring to FIG. 27, a modular and electromechanically integrated easy-entry mechanism of the present invention is at an initial position in the slide rail assemblies 300. When the passenger needs to perform the comfort adjustment, the unlocking head 231 acts on a stop adjustment surface 122*aa* on the U-shaped unlocking support 122*a* of the U-shaped unlocking support assembly 122 to drive the U-shaped unlocking support assembly 122 to move. Further, an easy-entry adjustment surface 122*ab* on the U-shaped unlocking support 122*a* of the U-shaped unlocking support assembly 122 acts on the unlocking pins 353 in the slide rail locking mechanisms of the slide rail assemblies to unlock the slide rail locking mechanisms and adjust the position of the seat.

Referring to FIG. 28 to FIG. 31, when the passenger needs to enter the third row, the cable support 131*a* in the cable support assembly 131 is driven and pulled by the easy-entry drive unlocking cable or the easy-entry unlocking wire, and the cable support 131*a* drives the pinion 132 to rotate clockwise to drive the sector gear 133 to rotate counterclockwise, thereby driving the easy-entry unlocking arm assembly 134 to rotate counterclockwise. Further, the easy-entry adjustment surface 122*ab* of the U-shaped unlocking support assembly 122 in the slide rail parallel-unlocking mechanism submodule 120 is driven the unlocking pins 353 downward to unlock the slide rail assemblies 300. In addition, the rotating easy-entry unlocking arm assembly 134 acts on the stop support 121 to drive the stop support 121 to rotate about the rotary shaft 125, so that the stop 121*a* on the stop support 121 is lifted upward, and the upper slide rails 310 in the slide rail assemblies 300 pass through the holder stop 342 on the holder 340 during sliding forward.

The trigger roller riveting assembly 145 is driven to rotate clockwise synchronously through the four-bar linkage mechanism. As the passenger pushes the seat to slide forward and enter the easy-entry travel, the trigger roller 143 slides or rolls on the unlocking holding surface 341 of the holder 340, thereby maintaining the U-shaped unlocking support assembly 122 at the initial unlocked position through the four-bar linkage mechanism. In this case, the driving force of the easy-entry unlocking cable or the easy-entry unlocking wire is removed, so that the slide rail assemblies 300 can still maintain the normal unlocked state. The seat slides forward to a front-most position (a position shown in FIG. 30), so that the passenger has enough space to enter the third row until the seat is limited by the front end travel stop 314 on the upper slide rails 310 and the front end travel stop 323 on the lower slide rails (see FIG. 25).

When the passenger enters the third row, the second row of seats are driven back. When the seats are retracted to the front-most position of the comfort travel, the cable support 131*a* in the cable support assembly 131 is not driven by an external force. The four-bar linkage mechanism is driven by a reverse action of the pair of locking springs 352 of the slide rail assemblies 300 to drive the trigger roller riveting assembly 145 to fall back rapidly, so that the slide rail assemblies 300 are locked at the front-end position of the comfort travel.

Figures 32A, 32B, 32C, 32D:
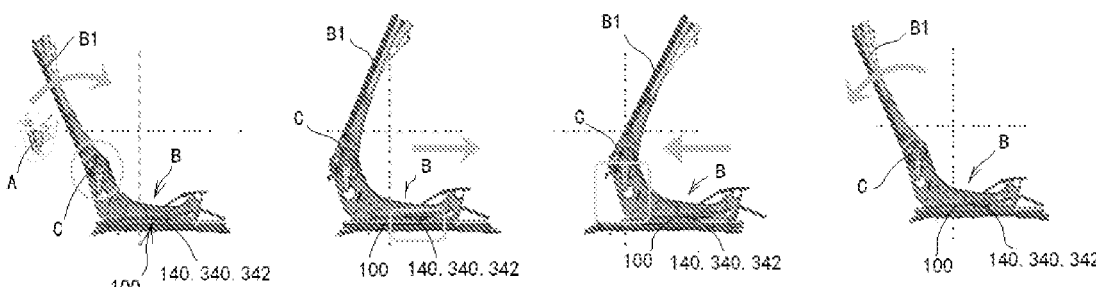
FIG. 32*a* to FIG. 32D are schematic flowcharts showing that a modular and electromechanically integrated easy-entry mechanism and slide rail assemblies are applied to current mainstream second-row seats with an easy-entry TIP (backrest folding) function, and the modular and electromechanical integrated easy-entry mechanism is driven through manual or electric unlocking to unlock the slide rail assemblies to realize an easy-entry function of slide rail of a seat according to the present invention.

In addition, the modular and electromechanically integrated easy-entry mechanism of the present invention may also be applied to the current two-row mainstream seat with the easy-entry function of slide rails. Manual or electric unlocking transmission can cause the function of driving the slide rail assemblies to be feasible. Referring to FIG. 32*a* to FIG. 32*b* specifically, an unlocking handle A triggers a seat angle adjuster C to unlock to achieve an easy-entry action of a seat backrest B1. During the adjustment of the seat backrest B1, the easy-entry module 100 in the modular and electromechanically integrated easy-entry mechanism of the present invention is triggered by the easy-entry unlocking cable or the easy-entry unlocking wire, so that the unlocking maintenance and tolerance expansion structure submodule 140 in the easy-entry module 100 passes through the holder stop 342 on the holder 340 and the seat B can move forward. Referring to FIG. 32*c* and FIG. 32*d*, when the seat B slides backward until the unlocking maintenance and tolerance expansion structure submodule 140 in the easy-entry module 100 of the present invention is triggered, the seat backrest B1 is flipped backward to the first locking position of the seat angle adjuster C after the unlocking maintenance and tolerance expansion structure submodule 140 passes through the holder stop 342 on the holder 340 and returns to the set position.

Figures 33A, 33B, 33C, 33D:
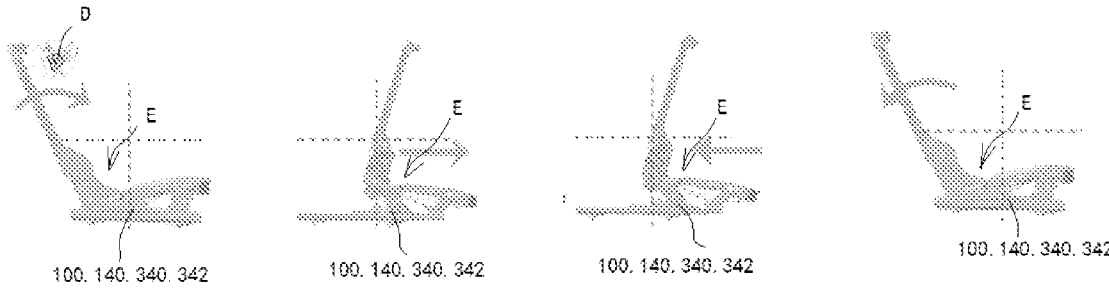
FIG. 33*a* to FIG. 33*d* are schematic flowcharts showing that a modular and electromechanically integrated easy-entry mechanism and slide rail assemblies are applied to current mainstream second-row seats with an easy-entry PITCH (seat folding) function, and the modular and electromechanical integrated easy-entry mechanism is driven through manual or electric unlocking to unlock the slide rail assemblies to realize an easy-entry function of a slide rail according to the present invention.

Referring to FIG. 33*a* and FIG. 33*d*, a ground lock is unlocked by the unlocking handle D. The seat E is lifted by the four-bar linkage mechanism of the seat E under the action of a plate spring force of the seat, and the four-bar linkage mechanism of the seat E triggers the easy-entry module 100 in the modular and electromechanically integrated easy-entry mechanism of the present invention, so that the unlocking maintenance and tolerance expansion structure submodule 140 in the easy-entry module 100 passes through the holder stop 342 on the holder 340 and the seat D can move forward. When the seat E slides backward until the unlocking maintenance and tolerance expansion structure submodule 140 in the easy-entry module 100 of the present invention is triggered, the seat E is flipped back to the initial position and continues to push back the seat E until the ground lock is locked after the unlocking maintenance and tolerance expansion structure submodule 140 passes through the holder stop 342 on the holder 340 and returns to the set position.

What is claimed is:

1. A modular and electromechanically integrated easy-entry mechanism, comprising an easy-entry mechanism, wherein the easy-entry mechanism is manufactured independently of one or more slide rail assemblies and is mounted on upper slide rails in the slide rail assemblies by using fasteners, a total travel of slide rails is divided into a comfort travel for front-rear adjustment of a passenger and an easy-entry travel for increasing an easy-entry/exit space for a passenger in the third row seating, the unlocking of the slide rails is mechanically maintained in the easy-entry travel, and the slide rails are ensured to be locked at the front-most position of the comfort travel when a seat is retracted; and the easy-entry mechanism is driven manually or by electric power, and acts independently on unlocking pins in slide rail locking mechanisms to unlock the slide rail assemblies, further comprising an easy-entry module and a manual slide rail unlocking module, wherein the easy-entry module and the manual slide rail unlocking module are manufactured independently of the slide rail assemblies, and a fixed support in the easy-entry module is mounted on the upper slide rails in the slide rail assemblies by using fasteners; and a rotary shaft of the manual slide rail unlocking module is arranged on the fixed support, and the easy-entry module and the manual slide rail unlocking module act independently on the unlocking pins in the slide rail locking mechanisms in the slide rail assemblies to unlock the slide rail locking mechanisms, wherein the easy-entry module further comprises a slide rail parallel-unlocking mechanism submodule, an unlocking force and displacement adjustment mechanism submodule, an unlocking maintenance and tolerance expansion structure submodule, a cable limit assembly, and an easy-entry return spring mounted in the fixed support, an easy-entry unlocking cable is driven manually or by electric power to drive the unlocking force and displacement adjustment mechanism submodule to move and thereby drive the slide rail parallel-unlocking mechanism submodule and the unlocking maintenance and tolerance expansion structure submodule to achieve easy-entry unlocking through linkage, and the cable limit assembly performs unlocking limit maintenance on the unlocking force and displacement adjustment mechanism submodule; the easy-entry return spring drives the unlocking force and displacement adjustment mechanism submodule to return and thereby drives the slide rail parallel-unlocking mechanism submodule and the unlocking maintenance and tolerance expansion structure submodule to return; the slide rail parallel-unlocking mechanism submodule drives the slide rail locking mechanisms to unlock; the slide rail parallel-unlocking mechanism submodule fits in with a comfort adjustment front travel stop in the slide rail assemblies to limit a forward sliding position of a seat; and a rear upper stop on the upper slide rails in the slide rail assemblies fits in with a rear lower stop on lower slide rails in the slide rail assemblies to limit a backward sliding position of the seat.

2. The modular and electromechanically integrated easy-entry mechanism according to claim 1, wherein the slide rail parallel-unlocking mechanism submodule comprises:

a U-shaped unlocking support assembly axially arranged on the fixed support, wherein an easy-entry adjustment surface and a stop adjustment surface are arranged on a U-shaped unlocking support of the U-shaped unlocking support assembly, and during the easy-entry unlocking, the easy-entry adjustment surface acts on the unlocking pins of the slide rail locking mechanisms in the slide rail assemblies to unlock the slide rail locking mechanisms; and two ends respectively act on the U-shaped unlocking support assembly and an unlocking return spring on the fixed support.

3. The modular and electromechanically integrated easy-entry mechanism according to claim 2, wherein the U-shaped unlocking support of the U-shaped unlocking support assembly has an axially arranged end having a U-shaped structure, two axially arranged arms are arranged on the axially arranged end having a U-shaped structure; a shaft hole is formed on each of the two axially arranged arms, the shaft holes on the two axially arranged arms are coaxial, a shaft hole and a draw hole are respectively formed on two support arms of the fixed support corresponding to positions at which the U-shaped unlocking support assembly is axially arranged, the shaft hole and the draw hole are coaxial and internal threads are arranged in the draw hole, the axially arranged end having a U-shaped structure of the U-shaped unlocking support is axially arranged between the two support arms of the fixed support by extending through the shaft hole on one of the support arms, the shaft hole on one of the axially arranged arms, the unlocking return spring, the shaft hole on the other axially arranged arm, an axially arranged bolt of the draw hole on the other of the support arms in sequence, a threaded end of the axially arranged bolt is screwed on the internal threads of the draw hole on the other of the support arms, the axially arranged bolt is tightened to meet a torque requirement, and the axially arranged end having a U-shaped structure of the U-shaped unlocking support rotates about the axially arranged bolt.

4. The modular and electromechanically integrated easy-entry mechanism according to claim 3, wherein a sleeve is arranged on the axially arranged bolt, and two ends of the sleeve in an axial direction extend through the two shaft holes and contact inner surfaces of the two support arms of the fixed support.

5. The modular and electromechanically integrated easy-entry mechanism according to claim 2, wherein the slide rail parallel-unlocking mechanism submodule further comprises:

a stop support axially arranged on the fixed support, wherein a stop is arranged on the stop support, and the stop fits in with the comfort adjustment front travel stop of the slide rail assemblies to limit the forward sliding position of the seat; and two ends respectively act on the stop support and a stop support return spring on the fixed support.

6. The modular and electromechanically integrated easy-entry mechanism according to claim 5, wherein the unlocking force and displacement adjustment mechanism submodule comprises:

a cable support assembly, connected to the easy-entry unlocking cable and axially arranged between two support arms of the fixed support, wherein the cable support assembly is configured with a pinion;

a sector gear, axially arranged between the two support arms of the fixed support, wherein the sector gear is meshed with the pinion, and the pinion drives the sector gear to rotate; and an easy-entry unlocking arm assembly, arranged between the two support arms of the fixed support and driven by the sector gear to rotate synchronously with the sector gear, wherein an easy-entry unlocking surface in the easy-entry unlocking arm assembly acts on an easy-entry adjustment surface of the U-shaped unlocking support assembly to drive the U-shaped unlocking support assembly to move for an easy-entry unlocking operation.

7. The modular and electromechanically integrated easy-entry mechanism according to claim 6, wherein the cable limit assembly is fixed to one of the support arms of the fixed support, and a limiting head in the cable limit assembly fits in with an easy-entry unlocking arm of the easy-entry unlocking arm assembly to limit the easy-entry unlocking arm of the easy-entry unlocking arm assembly.

8. The modular and electromechanically integrated easy-entry mechanism according to claim 7, wherein one end of the easy-entry return spring is hooked on the easy-entry unlocking arm of the easy-entry unlocking arm assembly, and the other end is hooked on one of the support arms of the fixed support.

9. The modular and electromechanically integrated easy-entry mechanism according to claim 8, wherein the unlocking force and displacement adjustment mechanism submodule further comprises a gear limit support arranged between the two support arms of the fixed support and anchored with one of the support arms, and two ends of a step shaft in the sector gear and two ends of the pinion are respectively axially arranged on the other of the support arms of the fixed support and the gear limit support.

10. The modular and electromechanically integrated easy-entry mechanism according to claim 8, wherein the unlocking maintenance and tolerance expansion structure submodule comprises:

a connecting rod, wherein one end of the connecting rod is hinged with the easy-entry unlocking arm;

a connecting support assembly, axially arranged on one of the support arms of the fixed support, wherein the connecting support assembly is hinged with the other end of the connecting rod, and the easy-entry unlocking arm drives the connecting support assembly to rotate through the connecting rod; and a trigger roller, fixed to the connecting support assembly, wherein the trigger roller swings with the rotation of the connecting support assembly, the trigger roller is rotatable under the action of friction, and the trigger roller fits in with a front holder in the slide rail assemblies for unlocking limit maintenance when the seat is in an easy-entry state and slides forward.

11. The modular and electromechanically integrated easy-entry mechanism according to claim 10, wherein the manual slide rail unlocking module comprises a handle, an unlocking synchronization rod, and an unlocking rod, the unlocking synchronization rod is fixedly connected to the handle, one end of the unlocking rod is fixedly connected to the unlocking synchronization rod, an end of the unlocking synchronization rod is axially arranged on one of the support arms of the fixed support through a rotary support cover, an unlocking head is arranged on the other end of the unlocking rod, and when a passenger requires unlocking during comfort adjustment of the seat, the unlocking head acts on the stop adjustment surface on the U-shaped unlocking support assembly to drive the U-shaped unlocking support assembly to move, so that the easy-entry adjustment surface acts on the unlocking pins of the slide rail locking mechanisms in the slide rail assemblies to unlock the slide rail locking mechanisms.

\* \* \* \* \*